(12) United States Patent
Moriwaki

(10) Patent No.: US 8,654,092 B2
(45) Date of Patent: Feb. 18, 2014

(54) TOUCH PANEL INCORPORATING DISPLAY DEVICE

(75) Inventor: Hiroyuki Moriwaki, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 266 days.

(21) Appl. No.: 13/146,130

(22) PCT Filed: Sep. 2, 2009

(86) PCT No.: PCT/JP2009/065293
§ 371 (c)(1),
(2), (4) Date: Jul. 26, 2011

(87) PCT Pub. No.: WO2010/084642
PCT Pub. Date: Jul. 29, 2010

(65) Prior Publication Data
US 2011/0291977 A1 Dec. 1, 2011

(30) Foreign Application Priority Data

Jan. 26, 2009 (JP) .................................. 2009-013822

(51) Int. Cl.
G06F 3/0488 (2013.01)
(52) U.S. Cl.
USPC ............................. 345/173; 345/174; 349/12
(58) Field of Classification Search
None
See application file for complete search history.

(56) References Cited

U.S. PATENT DOCUMENTS

| 2008/0129898 A1 | 6/2008 | Moon |
| 2009/0085885 A1* | 4/2009 | Wu et al. ........................ 345/173 |
| 2009/0146964 A1* | 6/2009 | Park et al. ...................... 345/173 |
| 2010/0013785 A1 | 1/2010 | Murai et al. |

FOREIGN PATENT DOCUMENTS

| JP | 2008-122913 A | 5/2008 |
| WO | 2008/108042 A1 | 9/2008 |

* cited by examiner

Primary Examiner — Joseph Haley
(74) Attorney, Agent, or Firm — Chen Yoshimura LLP

(57) ABSTRACT

In a touch panel incorporating a display device, a first sensor line (120) narrower than a first dummy line (130) is disposed on an interlayer insulating film (240) formed on an insulating substrate (100) at a location corresponding to a first dummy line (130), and a second sensor line (150) narrower than the data line (140) is formed on the interlayer insulating film (240) at the location corresponding to the data line (140). The first sensor line (120) and the second sensor line (150) are disposed such that they do not extend beyond the widths of the first dummy line (130) and the data line (140), respectively, when observed in a plan view. Provided is a touch panel incorporating a display device in which the locations of the first sensor line (120) and the second sensor line (150) are adjusted to prevent the aperture ratio reduction in the display element section (11).

32 Claims, 21 Drawing Sheets (A) Prior Art (B) Prior Art (A)

TOUCH PANEL INCORPORATING DISPLAY DEVICE

TECHNICAL FIELD

The present invention relates to a touch panel incorporating a display device. More particularly, the present invention relates to a touch panel incorporating a display device capable of identifying the location of a touch on the panel based on the change in the voltage of sensor lines.

BACKGROUND ART

In recent years, an increased number of electronic devices that require menu selections are equipped with touch panels, which allow users to touch the panel as guided by the screen display by a pen or a finger to select a desired menu. Such electronic devices use a wide variety of systems for identifying the location of a touch on the panel.

Patent Document 1 discloses a touch panel incorporating a liquid crystal display device that identifies the location of a touch by measuring the difference in voltage between a sensor line and a dummy line provided in the touch panel incorporating a liquid crystal display device. FIG. 21(A) is a plan view showing a part of the pattern arrangement in the display element section of a conventional touch panel incorporating a liquid crystal display device disclosed in Patent Document 1, and FIG. 21(B) is a cross-sectional view of the display element section, taken along the line Z-Z of FIG. 21(A).

The manner a touch panel incorporating a liquid crystal display device operates to identify a touch on the panel is briefly described with reference to FIG. 21. A touch panel incorporating a liquid crystal display device includes a TFT (Thin Film Transistor) substrate composed of a glass substrate 500 with a display element section 25 and driver circuits (not shown) formed thereon, and a CF (Color Filter) substrate composed of a glass substrate 800 with a color filter, a common electrode, and the like formed thereon. The substrates are disposed facing each other. On the glass substrate 500, not only a plurality of data lines 540, which are made of a conductive film, and a plurality of gate lines 510, which are made of a conductive film that is different from that of the data line 540, are arranged such that they cross each other, but also, for each of the data lines 540, a pair of a sensor line 550 and a dummy line 560 is formed in parallel with each other in the same layer as the data line 540, and for each of the gate lines 510, a pair of a sensor line 520 and a dummy line 530 are formed in parallel with each other in the same layer as the gate line 510.

In such touch panel incorporating a liquid crystal display device, when the surface of the CF substrate is pressed, a common electrode 840 formed on a surface of a sensor spacer 830 provided on the glass substrate 800 touches conductive pads 700 and 750 respectively connected to sensor lines 520 and 550, and the common voltage supplied to the common electrode 840 is supplied to the sensor lines 520 and 550 through the conductive pads 700 and 750, respectively. On the other hand, a reference voltage is supplied to dummy lines 530 and 560. The touch panel incorporating a liquid crystal display device compares the common voltage supplied to the sensor lines 520 and 550 against the reference voltage supplied to the dummy lines 530 and 560 to identify the location of the touch on the CF substrate.

RELATED ART DOCUMENTS

Patent Documents

Patent Document 1: Japanese Patent Application Laid-Open Publication No. 2008-122913

SUMMARY OF THE INVENTION

Problems to be Solved by Invention

However, one problem with the touch panel incorporating a liquid crystal display device disclosed in Patent Document 1 is that the touch panel includes not only the gate line 510 and the data line 540, but also the sensor lines 520 and 550 and the dummy lines 530 and 560 on the TFT substrate, and therefore the aperture ratio of a display element section 25 is reduced accordingly.

Also, the depths from the surface of a protective insulating film 640 to a first pad wiring 721 connected to the sensor line 520 and to a second pad wiring 772 connected to the sensor line 550 are different. This means that, in order to form conductive pads 700 and 750, a contact hole 710 for connection to the first pad wiring 721 and a contact hole 760 for connection to the second pad wiring 772 must be formed in separate steps. As a result, the manufacturing process becomes complex, increasing the manufacturing costs.

An objective of the present invention is to provide a touch panel incorporating a display device in which sensor lines are arranged in such manner as to prevent the aperture ratio reduction in the display element section. Another objective of the present invention is to provide a touch panel incorporating a display device that can be manufactured at a lower cost through a simplified manufacturing process.

Means for Solving the Problems

A first aspect of the present invention is a touch panel incorporating a display device, having a first insulating substrate and a second insulating substrate facing each other, identifying the location of a touch on the surface of the second insulating substrate based on a prescribed voltage provided when the surface is touched, and including: a plurality of first sensor lines formed on the first insulating substrate to extend in a first direction; a plurality of second sensor lines formed on the first insulating substrate to extend in a second direction that intersects the first direction; a first wiring formed to extend in the first direction and including a plurality of gate lines; a second wiring formed to extend in the second direction and including a plurality of data lines; a plurality of display element sections formed in respective regions where the plurality of gate lines and the plurality of data lines cross each other; and a location-identifying circuit that identifies the location of a touch on a surface of the second insulating substrate based on a prescribed voltage supplied when the surface is touched to the first and the second sensor lines connected to the display element sections at the location that is touched, wherein at least either the first sensor line or the second sensor line is disposed over any of the wirings included in the first wiring or the second wiring in such manner as to overlap at least partially in the width direction with the wiring included in the first wiring or the second wiring when observed in a plan view.

A second aspect of the present invention is the first aspect of the present invention, wherein at least one of the first wiring or the second wiring further includes: either a plurality of first dummy lines formed to extend in the first direction and provided with a reference voltage, or a plurality of second dummy lines formed to extend in the second direction and provided with the reference voltage; and the location-identifying circuit includes a comparative identifying circuit that identifies the location of a touch on the second insulating substrate by comparing the prescribed voltage supplied when the surface is touched to the first sensor line and the second sensor line against the reference voltage.

A third aspect of the present invention is the second aspect of the present invention, wherein the first wiring further includes an auxiliary capacitance line formed to extend in the first direction.

A fourth aspect of the present invention is the first aspect of the present invention, wherein the first wiring further includes an auxiliary capacitance line formed to extend in the first direction.

A fifth aspect of the present invention is any one of the first to fourth aspects of the present invention, further including a connecting body disposed over at least either the first sensor line or the second sensor line, wherein the first sensor line and the second sensor line are formed of a conductive film of the same layer, the at least either the first sensor line or the second sensor line is constituted of separate conductive bodies, and the separate conductive bodies are electrically connected to each other by the connecting body.

A sixth aspect of the present invention is the first aspect of the present invention, wherein the first sensor line is disposed over the gate line; the second sensor line is formed of the conductive film in the same layer as the first sensor line, and disposed over the data line; either one of the first sensor line or the second sensor line is constituted of a single conductive body, and the other sensor line is constituted of two conductive bodies sandwiching the single conductive body; the two conductive bodies are electrically connected to each other through a connecting body; and when the surface of the second insulating substrate is pressed, the pressing electrode touches the connecting body to supply the prescribed voltage to the two conductive bodies.

A seventh aspect of the present invention is the second aspect of the present invention, further including a plurality of first sensor electrodes electrically connected to the first sensor lines and provided in each of the display element sections and a plurality of second sensor electrodes electrically connected to the second sensor lines and provided in respective display element sections, wherein the second insulating substrate faces the first sensor electrode and the second sensor electrode with a prescribed space between them, and has a pressing electrode provided with the prescribed voltage; and when the surface of the second insulating substrate is pressed, the pressing electrode at the location that is pressed touches the corresponding first sensor electrode and the corresponding second sensor electrode to supply the prescribed voltage to the first sensor line and the second sensor line.

An eighth aspect of the present invention is the seventh aspect of the present invention, wherein at least either the first sensor line or the second sensor line is constituted of separate conductive bodies; either the first sensor electrode or the second sensor electrode corresponding to the at least either the first sensor line or the second sensor line includes a connecting body that electrically connects the separate conductive bodies together; and the pressing electrode touches the connecting body to supply the prescribed voltage to the separate conductive bodies.

A ninth aspect of the present invention is the eighth aspect of the present invention, wherein the first sensor line is constituted of a conductive film in a layer above the gate line and the data line, and is disposed over either the gate line or the first dummy line; the second sensor line is formed of a conductive film in the same layer as the first sensor line, and is disposed over the data line; either one of the first sensor line or the second sensor line is formed of a single conductive body, and the other sensor line is formed of two conductive bodies sandwiching the single conductive body; and the two conductive bodies are electrically connected to each other through the connecting body.

A tenth aspect of the present invention is the ninth aspect of the present invention, wherein either one of the first or the second sensor electrodes electrically connected to the one of the first sensor line or the second sensor line has a first contact hole leading to the single conductive body and a first pad section that is formed at a location facing the pressing electrode and is electrically connected to the single conductive body through the first contact hole; either one of the first or the second sensor electrodes that is electrically connected to the other sensor line has a second contact hole and a third contact hole leading to the respective two conductive bodies, and a second pad section that is disposed at a location facing the pressing electrode and is electrically connected to the aforementioned two respective conductive bodies through the second and the third contact holes; and the distance between the first pad section and the pressing electrode is equal to the distance between the second pad section and the pressing electrode.

An eleventh aspect of the present invention is the seventh aspect of the present invention, wherein the first sensor line is formed of a conductive film in the same layer as the gate line, and is disposed to extend in the first direction; and the second sensor line is formed of a conductive film in a layer above the gate line and the data line and is disposed over the data line.

A twelfth aspect of the present invention is the seventh aspect of the present invention, wherein the first sensor line is formed of a conductive film in the same layer as the gate line and is disposed to extend in the first direction; and the second sensor line is formed of a conductive film in a layer above the gate line and the data line and is disposed over the second dummy line.

A thirteenth aspect of the present invention is the seventh aspect of the present invention, wherein said first sensor line is formed of a conductive film in a layer above the gate line and the data line, and is disposed over the first dummy line; and the second sensor line is formed of a conductive film in the same layer as the data line and is disposed to extend in the second direction.

A fourteenth aspect of the present invention is the seventh aspect of the present invention, wherein the first sensor line is formed of a conductive film in a layer above the gate line and the data line and is disposed over the gate line, and the second sensor line is formed of a conductive film in the same layer as the data line and is disposed to extend in the second direction.

A fifteenth aspect of the present invention is any one of aspects 11 to 14 of the present invention, wherein the first sensor electrode includes a first pad electrode composed of a pad wiring branching off from the first sensor line and conductive pads sequentially laminated thereon, the conductive pads being made of conductive films in layers above the first sensor electrode; and the second sensor electrode includes a second pad electrode composed of a pad wiring branching off from the second sensor line and conductive pads sequentially laminated thereon, the conductive pads being made of conductive films of layers above the second sensor electrode.

A sixteenth aspect of the present invention is any one of the eleventh to fourteenth aspects of the present invention, further including a black matrix disposed over the pressing electrode to cover the pressing electrode.

A seventeenth aspect of the present invention is the third aspect of the present invention, further including a plurality of first sensor electrodes electrically connected to the first sensor lines and provided in each of the display element sections, and a plurality of second sensor electrodes electrically connected to the second sensor lines and provided in each of the display element sections, wherein the second insulating substrate faces the first sensor electrode and the second sensor electrode with a prescribed space provided inbetween and includes a pressing electrode provided with the prescribed voltage; and when the surface of the second insulating substrate is pressed, the pressing electrode at the location that is pressed touches the corresponding first sensor electrode and the corresponding second sensor electrode to supply the prescribed voltage to the first sensor line and the second sensor line.

An eighteenth aspect of the present invention is the seventeenth aspect of the present invention, wherein at least either the first sensor line or the second sensor line is constituted of separate conductive bodies; one of the first sensor electrode or the second sensor electrode corresponding to the at least either the first sensor line or the second sensor line includes a connecting body that connects the separate conductive bodies together; and the pressing electrode touches the connecting body to supply the prescribed voltage to the separate conductive bodies.

A nineteenth aspect of the present invention is the eighteenth aspect of the present invention, wherein an auxiliary capacitance line is made of a conductive film in the same layer as the gate line; the first sensor line is formed of a conductive film in the same layer as the second sensor line and is disposed over the auxiliary capacitance line; either one of the first sensor line or the second sensor line is constituted of a single conductive body, and the other sensor line is constituted of two conductive bodies sandwiching the single conductive body; and the two conductive bodies are electrically connected to each other through the connecting body.

A twentieth aspect of the present invention is the nineteenth aspect of the present invention, wherein the first dummy line made of a conductive film in the same layer as the second sensor line is further disposed over the auxiliary capacitance line.

A twenty-first aspect of the present invention is the nineteenth or the twentieth aspect of the present invention, wherein either one of the first sensor electrode or the second sensor electrode electrically connected to the one of the first sensor line or the second sensor line has a first contact hole that leads to the single conductive body, and a first pad section that is disposed facing the pressing electrode and is electrically connected to the single conductive body through the first contact hole; either one of the first sensor electrode or the second sensor electrode electrically connected to the other sensor line has second and third contact holes that respectively lead to the two conductive bodies, and a second pad section that is disposed facing the pressing electrode and is electrically connected to the two conductive bodies respectively through the second and third contact holes; and the distance between the first pad section and the pressing electrode is equal to the distance between the second pad section and the pressing electrode.

A twenty-second aspect of the present invention is the nineteenth or the twentieth aspect of the present invention, further including a black matrix disposed over the pressing electrode to cover the pressing electrode.

A twenty-third aspect of the present invention is the seventeenth aspect of the present invention, wherein an auxiliary capacitance line is formed of a conductive film in the same layer as the gate line; the gate line and the auxiliary capacitance line are formed of a light-shielding conductive film; the first sensor line is formed of a conductive film in a layer above the gate line and the data line, and is disposed over the auxiliary capacitance line; the second sensor line is formed of a conductive film in the same layer as the data line, and is disposed to extend in the second direction; the first sensor electrode and the second sensor electrode are disposed over the auxiliary capacitance line; and at least the first sensor line is disposed over the auxiliary capacitance line, between the first and second sensor electrodes and the edge in width direction of the auxiliary capacitance line.

A twenty-fourth aspect of the present invention is the twenty-third aspect of the present invention, wherein the first dummy line made of a conductive film in the same layer as the first sensor line is further disposed above the auxiliary capacitance line, between the first sensor line and an edge in the width direction of the auxiliary capacitance line.

A twenty-fifth aspect of the present invention is the twenty-third or the twenty-four aspect of the present invention, wherein the first sensor electrode includes a first pad electrode in which conductive pads made of conductive films in layers above the first sensor electrode are sequentially laminated on a pad wiring branching off from the first sensor line, and the second sensor electrode includes a second pad electrode in which conductive pads made of conductive films in layers above the second sensor electrode are sequentially laminated on the pad wiring branching off from the second sensor line.

A twenty-sixth aspect of the present invention is the fourth aspect of the present invention, wherein an auxiliary capacitance line is formed of a conductive film in the same layer as the gate line; the first sensor line is disposed over the auxiliary capacitance line; the second sensor line is formed of a conductive film in the same layer as the first sensor line and is disposed over the data line formed over the auxiliary capacitance line; either one of the first sensor line or the second sensor line is constituted of a single conductive body, while the other sensor line is constituted of two conductive bodies sandwiching the single conductive body; the two conductive body is electrically connected to each other through a connecting body; and when a surface of the second insulating substrate is pressed, the pressing electrode touches the connecting body to supply a prescribed voltage to the two conductive bodies.

A twenty-seventh aspect of the present invention is a touch panel incorporating a display device, having a first insulating substrate and a second insulating substrate facing each other, identifying the location of the touch on the second insulating substrate based on a prescribed voltage supplied when the surface is touched against a reference voltage already provided, and including: at least either a plurality of first dummy lines disposed on the first insulating substrate to extend in a first direction, or a plurality of second dummy lines disposed on the first insulating substrate to extend in a second direction crossing the first direction and provided with the reference voltage; a first wiring formed to extend in the first direction and including a plurality of gate lines and a plurality of first sensor lines; a second wiring formed to extend in the second direction and including a plurality of data lines and a plurality of second sensor lines; a plurality of display element sections formed for respective regions where the plurality of gate lines and the plurality of data lines cross each other; and a location-identifying circuit that identifies the location of a touch on a surface of the second insulating substrate by comparing the prescribed voltage that is supplied, when the surface is touched, to the first and second sensor lines connected to the display element sections at the location of the touch against the reference voltage, wherein at least either one of the first dummy line or the second dummy line is disposed over any one of wirings included in the first wiring or the second wiring in such manner as to overlap at least partially in the width direction with the any one of the wirings included in the first or second wiring when observed in a plan view.

A twenty-eighth aspect of the present invention is the twenty-seventh aspect of the present invention, wherein the first wiring further includes an auxiliary capacitance line formed to extend in the first direction.

A twenty-ninth aspect of the present invention is the twenty-seventh or twenty-eighth aspect of the present invention, further including a connecting body disposed over at least either the first dummy line or the second dummy line; the first dummy line and the second dummy line are formed of conductive films in the same layer, and the at least either the first dummy line or the second dummy line is constituted of two separate conductive bodies; and said two conductive bodies are electrically connected to each other through the second connecting body.

A thirtieth aspect of the present invention is the twenty-seventh aspect of the present invention, further including a first connecting body that is disposed over at least either one of the first sensor line or the second sensor line and is provided with the prescribed voltage from the pressing electrode when the surface of the second insulating substrate is pressed, and a second connecting body that is disposed over at least either the first dummy line or the second dummy line, wherein either the first sensor line and the second sensor line is constituted of separate first conductive bodies; either the first dummy line or the second dummy line is constituted of separate second conductive bodies; the first sensor line, the second sensor line, the first dummy line, and the second dummy line are formed of conductive films in the same layer; the second dummy line is disposed over the data line; the separate first conductive bodies are electrically connected to each other through the first connecting body; and the separate second conductive bodies are connected to each other through the second connecting body.

A thirty-first aspect of the present invention is the twenty-eighth aspect of the present invention, further including a first connecting body that is disposed over at least either the first sensor line or the second sensor line and that is provided with the prescribed voltage from the pressing electrode when the surface of the second insulating substrate is pressed, wherein either the first sensor line or the second sensor line is constituted of separate conductive bodies; at least the first sensor line, the second sensor line, and the first dummy line are formed of conductive films in the same layer; the first dummy line is disposed over the gate line; and the separate conductive bodies are electrically connected to each other through the connecting body.

A thirty-second aspect of the present invention is any one of the first to fourth aspects and the twenty-seventh and twenty-eighth aspects of the present invention, wherein the display element section includes a thin film transistor, and the oxide film conversion thickness of an insulating layer between the gate line and the data line is greater than the oxide film conversion thickness of a gate insulating layer of the thin film transistor.

Effects of the Invention

In the first aspect of the present invention, the first wiring includes a gate line, and the second wiring includes a data line. At least either one of the first sensor line or the second sensor line is disposed over at least any one of the wirings included in the first wiring or the second wiring in such manner as to overlap at least partially with the any of the wirings when observed in a plan view. This configuration can improve the aperture ratio of a touch panel incorporating a display device. The location-identifying circuit can identify the location of a touch on the surface of the second insulating substrate based on the prescribed voltage supplied to the first sensor line and the second sensor line when the surface is pressed.

In the second aspect of the present invention, at least either one of the first wiring or the second wiring further includes either a first dummy line or a second dummy line. At least either the first sensor line or the second sensor line is disposed over at least any one of the wirings included in the first wiring or the second wiring in such manner as to overlap at least partially with the any one of the wirings when observed in a plan view. This configuration can improve the aperture ratio of a touch panel incorporating a display device. The location-identifying circuit can identify the location of a touch by comparing the prescribed voltage supplied to the first sensor line and the second sensor line against the reference voltage supplied to the first dummy line and the second dummy line.

In the third aspect of the present invention, the first wiring further includes an auxiliary capacitance line. At least either one of the first sensor line or the second sensor line is disposed over at least any one of the wirings included in the first wiring or the second wiring in such manner as to overlap at least partially with the any of the wirings when observed in a plan view. This configuration can improve the aperture ratio of a touch panel incorporating a display device.

In the fourth aspect of the present invention, the first wiring includes a gate line and an auxiliary capacitance line, and the second wiring includes a data line. At least either one of the first sensor line or the second sensor line is disposed over at least any one of the wirings included in the first wiring or the second wiring in such manner as to overlap at least partially with the any one of the wirings when observed in a plan view. This configuration can improve the aperture ratio of a touch panel incorporating a display device.

In the fifth aspect of the present invention, at least either the first sensor line or the second sensor line is divided into separate conductive bodies constituting a sensor line, which are electrically connected to each other through a connecting body. With this configuration, the first sensor line and the second sensor line can be formed of the same conductive film without causing any short-circuiting.

In the sixth aspect of the present invention, the first sensor line is formed over the gate line, and the second sensor line is disposed over the data line. This configuration can improve the aperture ratio of the touch panel incorporating a display device. Either one of the first sensor line or the second sensor line is formed as a single conductive body, and the other sensor line is composed of two separate conductive bodies. With this configuration, the first sensor line and the second sensor line can be formed of the same conductive film, without causing any short-circuiting between them.

In the seventh aspect of the present invention, when the surface of the second insulating substrate is pressed, the pressing electrode formed on the second insulating substrate touches the first and second sensor electrodes respectively connected to the first and second sensor lines, to provide a prescribed voltage to the first and the second sensor lines. The touch panel incorporating a display device can then identify the location of a touch on the second insulating substrate based on the prescribed voltage supplied to the first and the second sensor line.

In the eighth aspect of the present invention, the sensor electrode corresponding to the divided sensor line includes a connecting body that connects the separate conductive bodies constituting the sensor line. In this case, the pressing electrode formed on the second insulating substrate touches the connecting body to supply the prescribed voltage to the divided sensor line.

In the ninth aspect of the present invention, the first sensor line is disposed over either the gate line or the first dummy line, and the second sensor line, which is formed of the same conductive film as the first sensor line, is disposed over the data line. This configuration can improve the aperture ratio of the touch panel incorporating a display device. Either one of the first sensor line or the second sensor line is formed as a single conductive body, and the other sensor line is divided into two conductive bodies. Consequently, the first sensor line and the second sensor line can be formed of the same conductive film, without causing short-circuiting between them.

In the tenth aspect of the present invention, because the first sensor line and the second sensor line are formed of conductive films in the same layer, the first, second, and third contact holes have the same depth. In this case, the contact holes can be opened without using a relay pad. Consequently, the aperture ratio of the display element section can further be improved, and the manufacturing process can be simplified. Also, when the surface of the second insulating substrate is pressed, the pressing electrode touches the first pad section and the second pad section simultaneously, supplying the prescribed voltage to the first sensor line and the second sensor line simultaneously.

In the eleventh aspect of the present invention, the second sensor line is formed of a conductive film in a layer above the gate line and the data line, and is disposed over the data line. This configuration can improve the aperture ratio of a touch panel incorporating a display device.

In the twelfth aspect of the present invention, the second sensor line is formed of a conductive film in a layer above the gate line and the data line, and is disposed over the second dummy line. This configuration can improve the aperture ratio of a touch panel incorporating a display device.

In the thirteenth aspect of the present invention, the first sensor line is formed of a conductive film in a layer above the gate line and the data line, and is disposed over the first dummy line. This configuration can improve the aperture ratio of a touch panel incorporating a display device.

In the fourteenth aspect of the present invention, the first sensor line is formed of a conductive film in a layer above the gate line and the data line, and is disposed over the gate line. This configuration can improve the aperture ratio of a touch panel incorporating a display device.

In the fifteenth aspect of the present invention, when the first sensor line and the second sensor line are formed of different conductive films, contact holes respectively leading to the first sensor line and the second sensor line are not opened simultaneously. Instead, conductive pads made of conductive films are sequentially laminated over the pad wirings respectively branching off from the first sensor line and from the second sensor line to form the first and second pad electrodes. Here, even if the depth to the first sensor line and the depth to the second sensor line are different, first and second sensor electrodes that respectively include the first pad electrode and the second pad electrode that touch the pressing electrode simultaneously can be formed. This configuration can supply the prescribed voltage to the first sensor line and the second sensor line simultaneously.

In the sixteenth aspect of the present invention, a black matrix is disposed to cover the pressing electrode. This configuration prevents the light from the backlight from passing through the pressing electrode, which can deteriorate the visibility of the image.

In the seventeenth aspect of the present invention, the effect of the invention is similar to that of the seventh aspect of the present invention.

In the eighteenth aspect of the present invention, the effect of the invention is similar to that of the eighth aspect of the present invention.

In the nineteenth aspect of the present invention, the first sensor line is disposed over the auxiliary capacitance line which is formed of a conductive film in the same layer as the gate line. This configuration improves the aperture ratio of a touch panel incorporating a display device in which an auxiliary capacitance line is provided. Here, because the first sensor line and the second sensor line are formed of conductive films in the same layer, one sensor line is constituted of a single conductive body, and the other sensor line is constituted of two conductive bodies sandwiching the one sensor line so that they do not cross each other. Consequently, the first sensor line and the second sensor line can be formed of the same conductive film, without causing short-circuiting between them.

In the twentieth aspect of the present invention, the first dummy line is further disposed over the auxiliary capacitance line. This configuration improves the aperture ratio of a touch panel incorporating a display device.

In the twenty-first aspect of the present invention, the effect of the invention is similar to that of the tenth aspect of the present invention.

In the twenty-second aspect of the present invention, the effect of the invention is similar to that of the sixteenth aspect of the present invention.

In the twenty-third aspect of the present invention, a first sensor line is disposed over the auxiliary capacitance line formed of a conductive layer in the same layer as the gate line. This configuration can improve the aperture ratio of a touch panel incorporating a display device. Here, because the first sensor line is disposed between the first and second sensor electrodes and the edge in the width direction of the auxiliary capacitance line formed of a light-shielding conductive film, the pressing electrode can be moved away from the edge of the auxiliary capacitance line. Consequently, the auxiliary capacitance line functions as a black matrix as well, and therefore can prevent the light from the backlight in the region not covered by the auxiliary capacitance line from passing through the pressing electrode. In this case, there is no need to dispose a black matrix that prevents the light passage through the pressing electrode. The manufacturing process therefore is simplified and the manufacturing costs can be reduced.

In the twenty-fourth aspect of the present invention, a first dummy line is further disposed over the auxiliary capacitance line formed of a conductive film in the same layer as the gate line. This configuration further improves the aperture ratio of the touch panel incorporating a display device. Here, because the first dummy line is disposed between the first sensor line and the edge of the width direction of the auxiliary capacitance line, the pressing electrode can be moved away from the edge of the auxiliary capacitance line. Consequently, the auxiliary capacitance line functions as a black matrix as well, and therefore can further prevent the light from the backlight in the region not covered by the auxiliary capacitance line from passing through the pressing electrode.

In the twenty-fifth aspect of the present invention, the effect of the invention is similar to that of the fifteenth aspect of the present invention.

In the twenty-sixth aspect of the present invention, the first sensor line is disposed over the auxiliary capacitance line, and the second sensor line, which is formed of a conductive film in the same layer as the first sensor line, is disposed over the data line. This configuration can improve the aperture ratio of a touch panel incorporating a display device. Either one of the first sensor line and the second sensor line is formed as a single conductive body, and the other sensor line is divided into two conductive bodies. Consequently, the first sensor line and the second sensor line can be formed of the same conductive film, without causing any short-circuiting between them.

In the twenty-seventh aspect of the present invention, the first wiring includes the gate line and the first sensor line, and the second wiring includes the data line and the second sensor line. At least either the first dummy line or the second dummy line is formed, and the formed dummy line is disposed over at least any one of the wirings included in the first wiring or the second wiring in such manner as to overlap at least partially with the any one of the wirings when observed in a plan view. This configuration can improve the touch panel incorporating a display device.

In the twenty-eighth aspect of the present invention, the first wiring further includes an auxiliary capacitance line. At least either one of the first dummy line and the second dummy line is formed, and the formed dummy line is disposed over at least any one of the wirings included in the first wiring or the second wiring in such manner as to overlap at least partially with the any one of the wirings when observed in a plan view. This configuration improves the aperture ratio of the touch panel incorporating a display device.

In the twenty-ninth aspect of the present invention, at least either one of the first dummy line and the second dummy line is divided into separate conductive bodies, and the separate conductive bodies are electrically connected to each other through a connecting body. Consequently, in the touch panel incorporating a display device, the first dummy line and the second dummy line can be formed of the same conductive film, without causing any short-circuiting between them.

In the thirtieth aspect of the present invention, the second dummy line is disposed over the data line, and therefore the aperture ratio of the touch panel incorporating a display device can be improved. Also, the first sensor line, the second sensor line, the first dummy line, and the second dummy line are formed of conductive films in the same layer. Here, in order to prevent short-circuiting among them, either one of the first sensor line and the second sensor line and either one of the first dummy line and the second dummy line are each constituted of separate conductive bodies. The separate sensor line segments are connected to each other with the first connecting body, and the separate dummy line segments are connected to each other with the second connecting body. Consequently, the first sensor line, the second sensor line, the first dummy line, and the second dummy line can be formed of the same conductive film, without causing any short-circuiting among them.

In the thirty-first aspect of the present invention, the first dummy line is disposed over the gate line. The aperture ratio of the touch panel incorporating a display device can therefore be improved. Here, the first sensor line, the second sensor line, and the first dummy line are formed of conductive films in the same layer. In order to prevent short-circuiting among the lines, either the first sensor line or the second sensor line is constituted of separate conductive bodies, and the separated sensor line segments are connected to each other through a connecting body. Consequently, the first sensor line, the second sensor line, and the first dummy line can be formed of the same conductive film without causing any short-circuiting.

In the thirty-second aspect of the present invention, an interlayer insulating layer is formed between the gate line and the data line, whose oxide film conversion thickness is greater the oxide film conversion thickness of the gate insulating layer of the thin film transistor. This configuration reduces the wiring cross capacitance at the intersecting portion of the gate line and the data line. As a result, delays in signals provided through the data line or the gate line can be prevented.

BRIEF DESCRIPTION OF THE DRAWINGS

FIG. 14(B) is a cross-sectional view of the display element section, taken along the line T-T of FIG. 14(A).

DETAILED DESCRIPTION OF EMBODIMENTS

1. Basic Study

Figure 1:
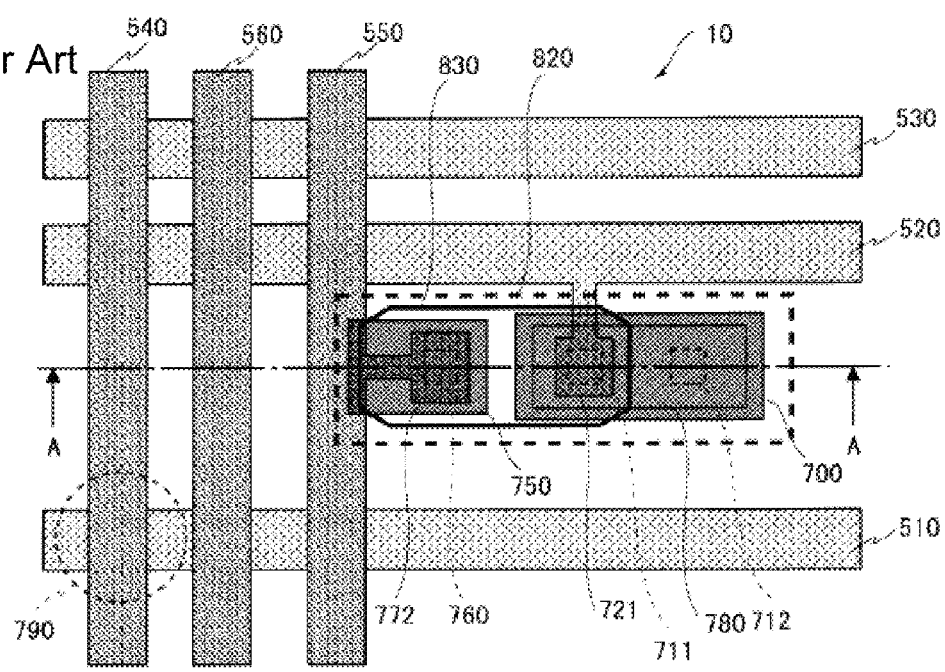
FIG. 1(A) is a plan view showing a part of the pattern arrangement in a display element section of the touch panel incorporating a liquid crystal display device used in the basic study conducted for the present invention.
FIG. 1(B) is a cross-sectional view of the display element section, taken along the line A-A of FIG. 1(A).
Figure 1:
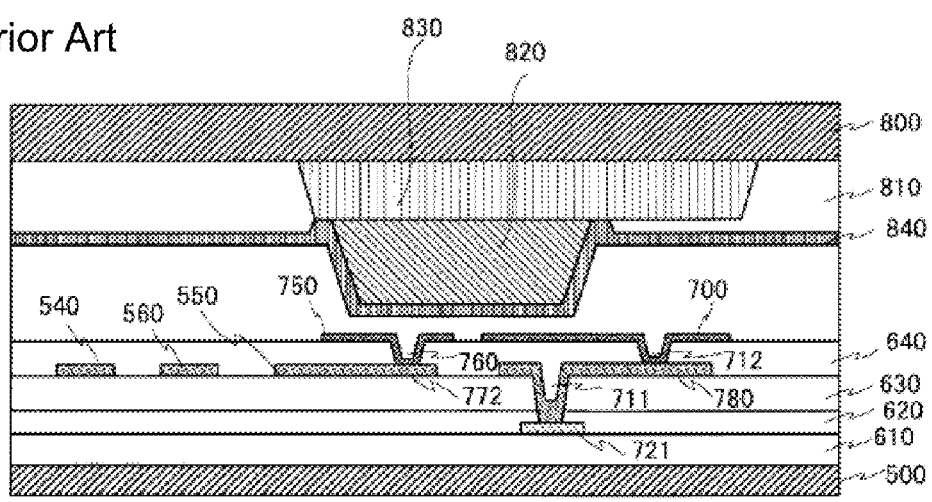

FIG. 1(A) is a plan view showing a part of the pattern arrangement in a display element section of the touch panel incorporating a liquid crystal display device used in the basic study conducted for the present invention, and FIG. 1(B) is a cross-sectional view of the display element section, taken along the line A-A of FIG. 1(A). Here, for a display element section 10 shown in FIG. 1, the same reference characters are provided for the constituting elements identical or corresponding to those of the conventional display element section 25 shown in FIG. 21, and mainly the difference from the display element section 25 is described.

Figure 21:
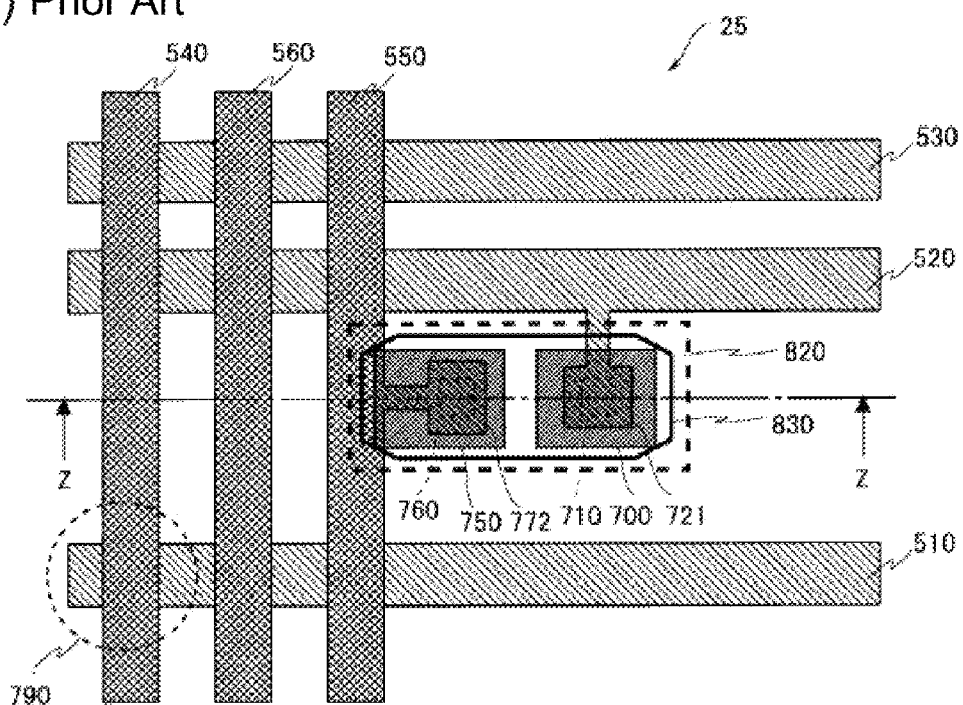
FIG. 21(A) is a plan view showing a part of the pattern arrangement in a display element section of a conventional touch panel incorporating a liquid crystal display device.
FIG. 21(B) is a cross-sectional view of the display element section, taken along the line Z-Z of FIG. 21(A).
Figure 21:
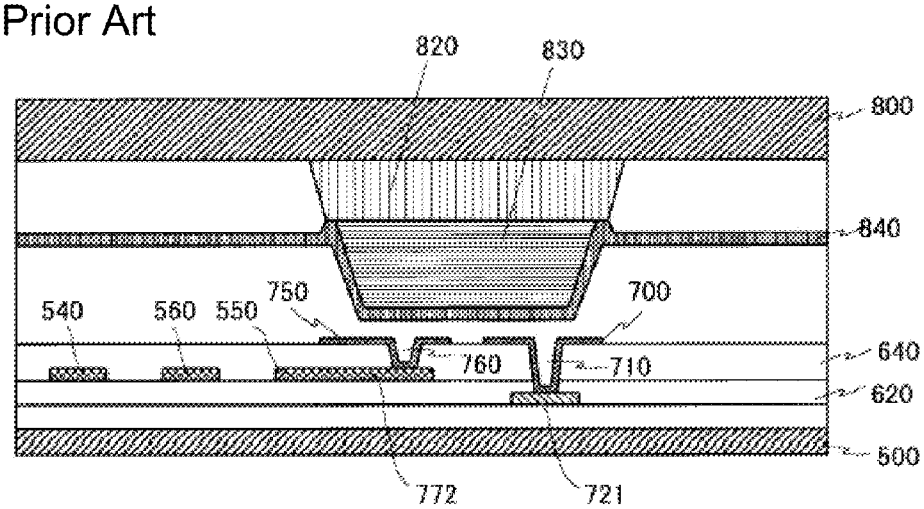

In the display element section 25 shown in FIG. 21, the only insulating film formed at the intersecting portion 790 of the gate line 510 and the data line 540 is a thin gate insulating film 620. As a result, the wiring cross capacitance at the intersecting portion 790 becomes greater. This configuration causes a problem that signals supplied through the gate line 510 or the data line 540 are delayed. To solve this problem, as shown in FIG. 1, an interlayer insulating film 630 is formed on the gate insulating film 620 to make the film thicker and to reduce the wiring cross capacitance. By forming the interlayer insulating film 630 on the gate insulating film 620, as just described, the gate line 510 and the data line 540 are separated by the gate insulating film 620 and the interlayer insulating film 630. As a result, the wiring cross capacitance at the intersecting portion 790 becomes smaller, and therefore the delay in the signals provided through the gate line 510 or the data line 540 can be prevented. When the wiring cross capacitance is considered, the film thicknesses of the gate insulating film 620 and the interlayer insulating film 630, whose dielectric constants are different, need to be converted to those of an oxidized film for proper evaluation.

However, problems with conventional touch panels incorporating a display device, i.e., reduced aperture ratio of the display element section 25 and a higher production cost, are not solved by forming the interlayer insulating film 630 on the gate insulating film 620.

As shown in FIG. 21, in the conventional display element section 25, while only a protective insulating film 640 is formed on the top surface of a second pad wiring 772 branched out from the sensor line 550, on the top surface of a first pad wiring 721 branched out from the sensor line 520, not only the protective insulating film 640 but also a gate insulating film 620 is formed. As a result, in the process in which a contact hole 760 connected to the second pad wiring 772 and a contact hole 710 connected to the first pad wiring 721 are formed simultaneously, when the contact hole 760 is opened to reach the second pad wiring 772, the contact hole 710 is not opened yet. The gate insulating film 620, therefore, has to be etched further until the contact hole 710 reaches the first pad wiring 721. However, because the contact hole 760 is already opened to reach the second pad wiring 772, a problem occurs in which the second pad wiring 772 is etched and become thinner while the contact hole 710 is being formed.

To solve the problem, as shown in FIG. 1, in the display element section 10, only a contact hole 711 to be connected to the first pad wiring 721 is opened prior to the formation of a protective insulating film 640, and a relay pad 780 made of a conductive film and connected to the first pad wiring 721 is formed on the interlayer insulating film 630. Further, a protective insulating film 640 is formed on the relay pad 780, and a contact hole 712 for connection to the relay pad 780 and a contact hole 760 for connection to the second pad wiring 772 are opened simultaneously. The problem of reduced thickness of the second pad wiring 772 can be solved by providing the relay pad 780 and forming the contact hole 711 and the contact hole 712 in separate steps, as described above.

The method described above, however, requires the formation of a large relay pad 780 between the interlayer insulating film 630 and the protective insulating film 640 to connect the contact hole 711 and the contact hole 712 together. This causes a new problem of reduced aperture ratio of the display element section 10.

2. Embodiment 1

Figure 2:
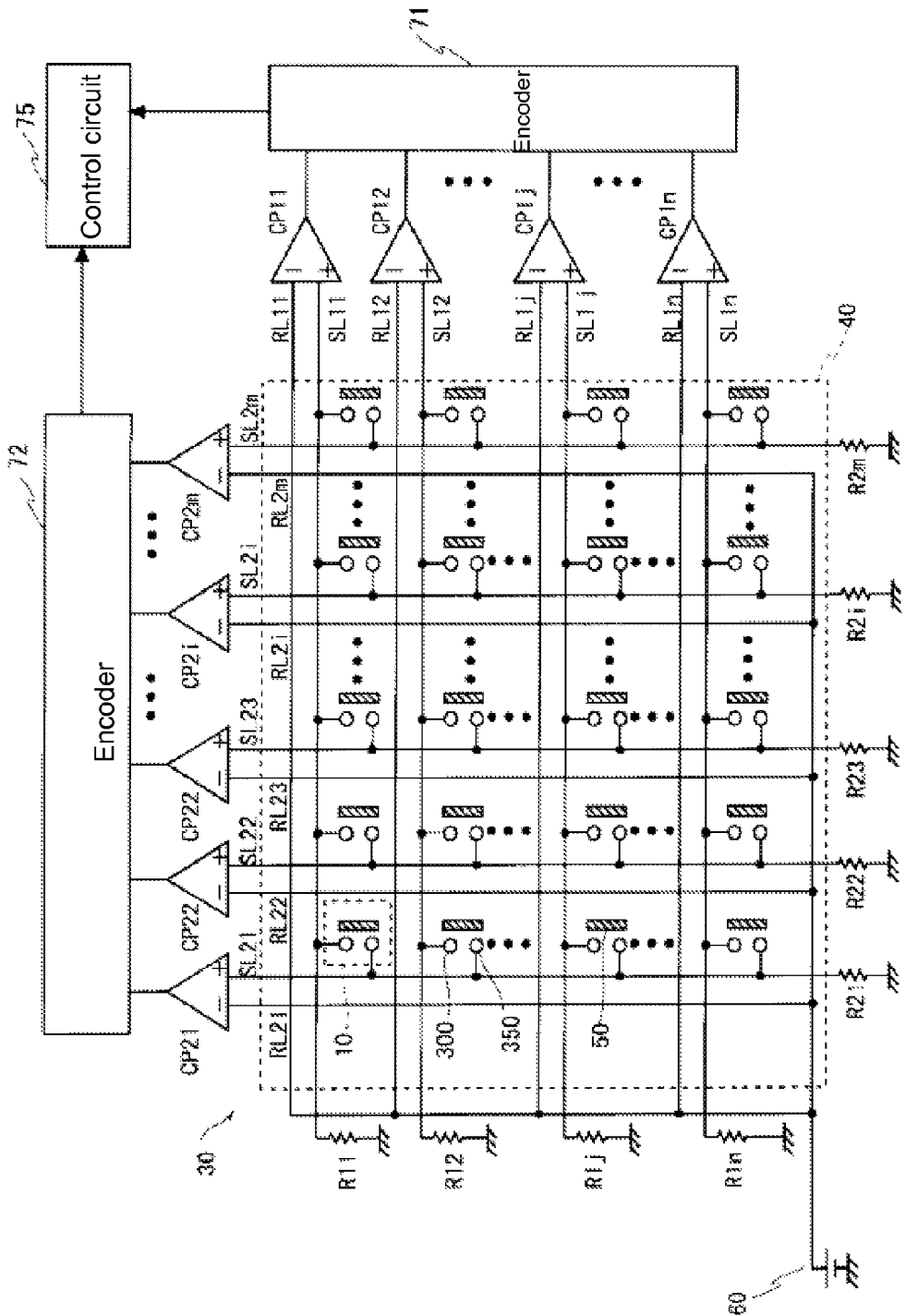
FIG. 2 shows the configuration of the touch panel incorporating a liquid crystal display device according to Embodiment 1 of the present invention.
Figure 3:
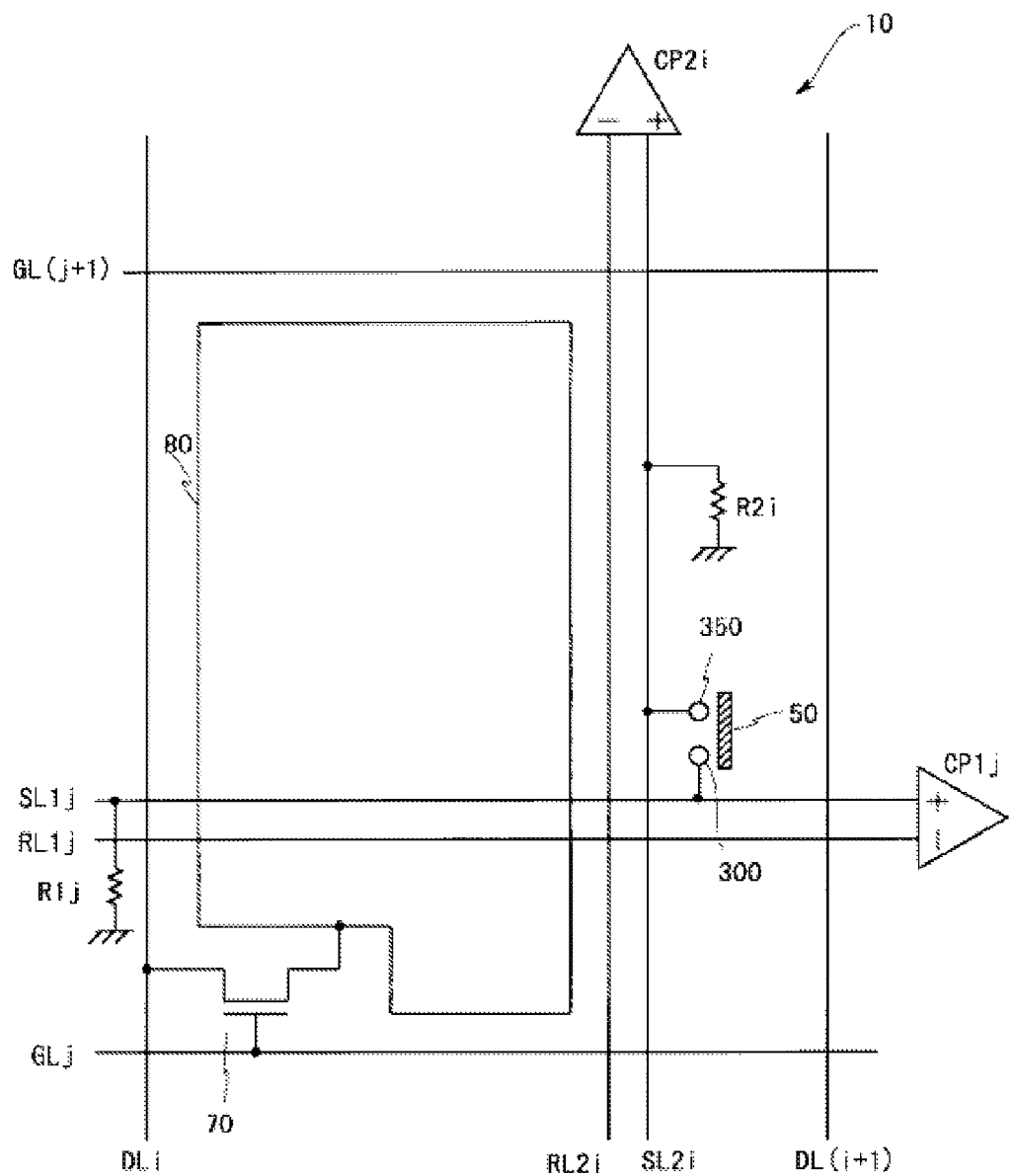
FIG. 3 shows the configuration of the pixel formation section on the TFT substrate side of the touch panel incorporating a liquid crystal display device shown in FIG. 2.
Figure 4:
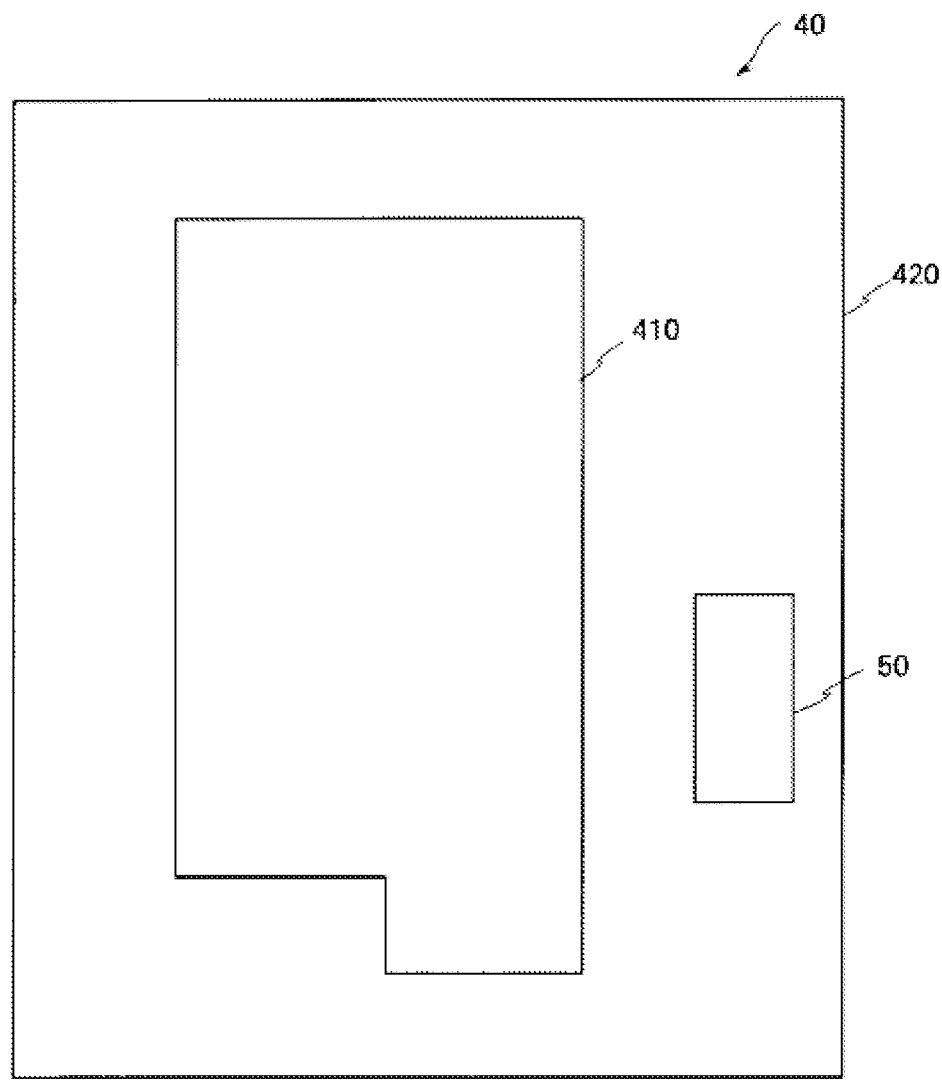
FIG. 4 shows the configuration of the pixel formation section on the CF substrate side of the touch panel incorporating a liquid crystal display device shown in FIG. 2.

2.1 Configuration of the Touch Panel Incorporating a Liquid Crystal Display Device FIG. 2 shows the configuration of the touch panel incorporating a display device according to Embodiment 1 of the present invention. FIG. 3 shows the configuration of the pixel formation section on the TFT substrate side of the touch panel incorporating a liquid crystal display device illustrated in FIG. 2. FIG. 4 shows the configuration of the pixel formation section on the CF substrate side of the touch panel incorporating a liquid crystal display device illustrated in FIG. 2.

As shown in FIG. 2, the touch panel incorporating a liquid crystal display device incorporates a liquid crystal display device composed of: a TFT substrate 30 constituted of a transparent insulating substrate such as a glass substrate, a quartz substrate, or a plastic substrate; a CF substrate 40 constituted of a transparent insulating substrate and disposed facing the TFT substrate 30; and a liquid crystal (not shown) sealed in the space between the substrates. On the insulating substrate of the TFT substrate 30, n ("n" is an integer of at least 1) gate lines GL1 to GLn, n first sensor lines SL11 to SL1$n$, and n first dummy lines RL11 to RL1$n$ are provided to extend in a horizontal direction, and m ("m" is an integer of at least 1) data lines DL1 to DLm, m second sensor lines SL21 to SL2$m$, and m second dummy lines RL21 to RL2$m$ are provided to extend in a vertical direction. A display element section 10 is provided for respective intersections of the gate lines GL1 to GLn and the data lines DL1 to DLm. In FIG. 2, gate lines GL1 to GLn and data lines DL1 to DLm are omitted for simplicity. Pulldown resistors R11 to R1$n$, which have high resistances, are grounded on one end, and are respectively connected to the first sensor lines SL11 to SL1$n$ on the other end. Similarly, pulldown resistors R21 to R2$m$, which have high resistances, are grounded on one end, and are respectively connected to the second sensor lines SL21 to SL2$m$ on the other end.

For first dummy lines RL11 to RL1$n$ and second dummy lines RL21 to RL2$m$, a prescribed reference voltage is provided from a reference power supply 60. Along the right edge of the TFT substrate 30, n first comparators CP11 to CP1$n$ are disposed. To the positive terminal of the $j^{th}$ ("j" is an integer of at least 1) first comparator CP1$j$, the $j^{th}$ first sensor line SL1$j$ is connected, and to the negative terminal, the $j^{th}$ first dummy line RL$j$ is connected. Along the top edge of the TFT substrate 30, m second comparators CP21 to CP2$m$ are disposed. To the positive terminal of $i^{th}$ ("i" is an integer of at least 1 and not greater than "m") second comparator CP2$i$, the $i^{th}$ second sensor line SL2$i$ is connected, and to the negative terminal, $i^{th}$ second dummy line RL$i$ is connected. Also, a first sensor electrode 300 is provided in each of the m display element sections 10 connected to the $j^{th}$ first sensor line SL1$j$, and a second sensor electrode 350 is provided in each of the n display element sections 10 connected to the $i^{th}$ second sensor line SL2$i$. Outputs of the first comparators CP11 to CP1$n$ and outputs of the second comparators CP21 to CP2$m$ are connected to a control circuit 75.

As shown in FIG. 3, a TFT 70 is provided in each display element section 10. The gate electrode of the $j^{th}$ row of the TFT 70 is connected to the gate line GL$j$, the source electrode of the $i^{th}$ column is connected to the data line DL$i$, and the drain electrode is connected to the pixel electrode 80. When the TFT 70 turns on, voltages according to image signals are supplied from the data line DL$i$ to the pixel electrode 80 through the TFT 70.

As shown in FIG. 4, on the CF substrate 40, a red, green, or blue color filter 410 is formed corresponding to the region that displays the image of the respective display element sections 10, and a black matrix 420 for preventing light leakage is formed to border the color filter 410. A pressuring electrode 50 is provided for each of the display element sections 10. The pressing electrode 50 is formed over the first sensor electrode 300 and the second sensor electrode 350, and has a common electrode with a common voltage formed on the surface. The black matrix 420 is provided also above the pressing electrode 50 to prevent leakage of light from the backlight. The common electrode is disposed on the CF substrate 40, facing the pixel electrode 80 formed on the TFT substrate 30 through the liquid crystal, and is provided commonly for the plurality of display element sections 10.

2.2 Operation of the Touch Panel Incorporating a Liquid Crystal Display Device

Next, the operation of the touch panel incorporating a liquid crystal display device is described. When the surface of the CF substrate 40 is touched by a pen or the like, the pressing electrode 50 on the CF substrate 40 disposed in the display element section 10 corresponding to the location of the touch is pressed toward the TFT substrate 30, and the pressing electrode 50 touches the first sensor electrode 300 and the second sensor electrode 350. As a result, a common voltage is applied to the first sensor line and the second sensor line. Once the pressure is off the surface of the CF substrate 40, the pressing electrode 50 returns to its original position, and the pressing electrode 50 moves away from the first sensor line and the second sensor line. As a result, the common voltage is not applied to the first sensor line or the second sensor line, and the potentials of the first sensor line and the second sensor line becomes the ground level through the pulldown resistors.

For the positive terminals of the first and second comparators, potentials of the first and second sensor lines are supplied, respectively. For the negative terminals, on the other hand, a reference voltage, which is lower than the common voltage, is supplied from the reference power source 60 through the first and the second dummy lines. The first and second comparators compares respectively the potentials supplied from the first and the second sensor lines with the reference voltage supplied from the first and the second dummy lines. The common voltage is supplied to the first and the second sensor lines connected to the display element corresponding to the location of the touch on the surface of the CF substrate 40. Because the common voltage is higher than the reference voltage, the first and the second comparators output high level signals. On the other hand, the first and the second sensor lines connected to the display element that are not at the location of the touch on the surface of the CF substrate 40 have the ground level potential, because they are grounded through the pulldown resistor. Consequently, the potentials of the first and the second sensor lines are lower than the reference voltage, and the first and the second comparators output low-level signals.

When any one of the first comparators CP11 to CP1*n* outputs a high-level signal, it indicates that the surface of the CF substrate 40 that corresponds to at least one display element section 10 connected to that first comparator is being pressed. Also, when any one of the second comparators CP21 to CP2*m* outputs a high-level signal, it indicates that the surface of the CF substrate 40 that corresponds to at least one display element section 10 connected to that second comparator is being pressed. The outputs of the first comparators CP11 to CP1*n* are supplied to a first encoder circuit 71 for conversion to bit signals, and output of the second comparators CP21 to CP2*m* are supplied to a second encoder circuit 72 for conversion to bit signals. The bit signals converted by the first and the second encoder circuits 71 and 72 are supplied to a control circuit 75, and the control circuit 75 identifies the location of a touch on the CF substrate 40 based on the bit signals provided.

2.3 Configuration of a Display Element Section

FIG. 5(A) is a plan view showing a part of the pattern arrangement of the display element section of the touch panel incorporating a liquid crystal display device according to Embodiment 1 of the present invention. FIG. 5(B) is a cross-sectional view of the display element section, taken along the line B-B of FIG. 5(A). FIG. 5(C) is a cross-sectional view of the display element section, taken along the line C-C of FIG. 5(A).

Figure 5:
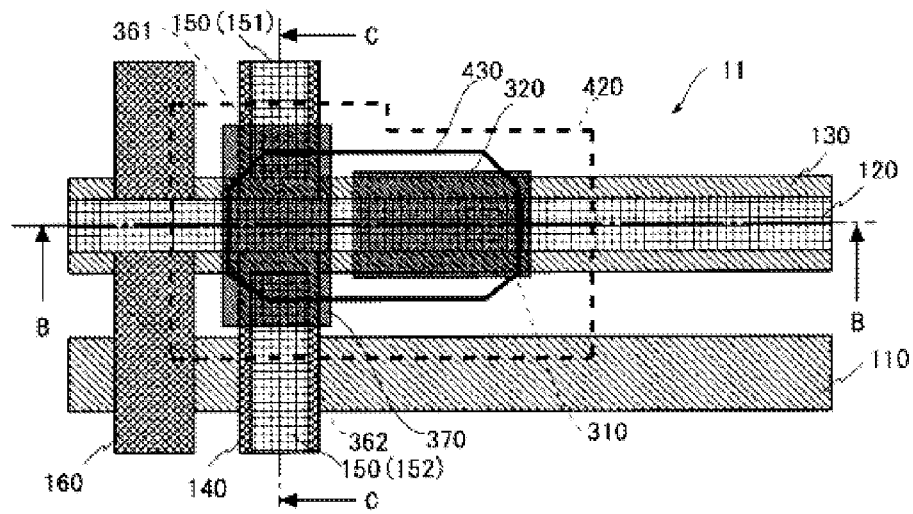
FIG. 5(A) is a plan view of a part of the pattern arrangement in a display element section of the touch panel incorporating a liquid crystal display device according to Embodiment 1 of the present invention.
FIG. 5(B) is a cross-sectional view of the display element section, taken along the line B-B of FIG. 5(A).
FIG. 5(C) is a cross-sectional view of the display element section, taken along the line C-C of FIG. 5(A).
Figure 5:
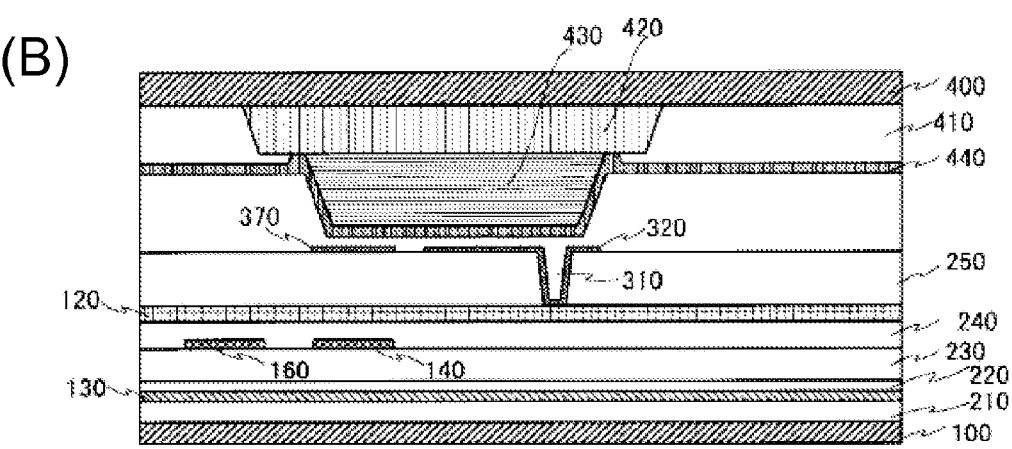
Figure 5:
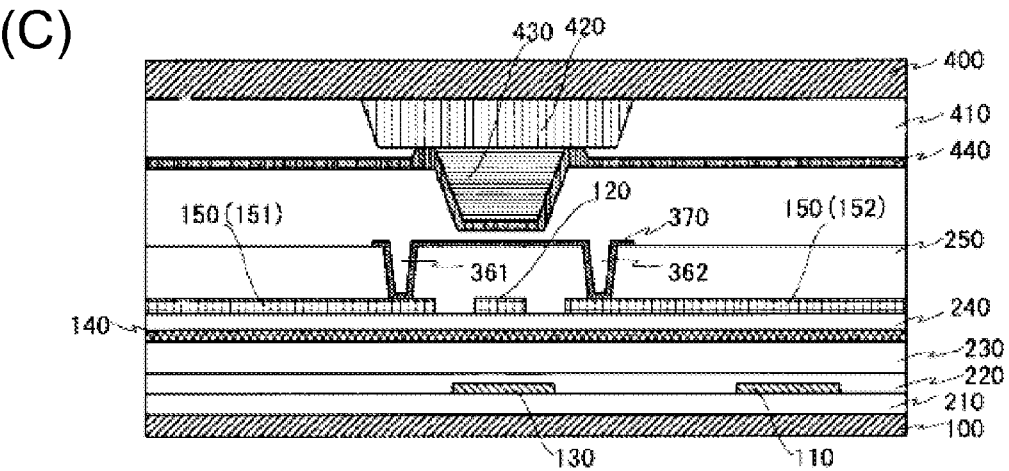

As shown in FIG. 5, the TFT substrate 30 is composed of a transparent insulating substrate 100 such as a glass substrate, a quartz substrate, or a plastic substrate, with a base insulating film 210 formed thereon, and a gate line 110 and a first dummy line 130 made of a first conductive film and extending in a horizontal direction, are formed over the base insulating film 210 in the same layer and in parallel with each other. The base insulating film 210 is made of an insulating film containing silicon, such as a silicon oxide film or a silicon nitride film, and the first conductive film is made of tantalum, tungsten, tantalum nitride, or an alloy or compound of such materials. Alternatively, the first conductive film can be, for example, a three-layered conductive film composed of, from the bottom, tantalum nitride, tantalum, and tantalum nitride, or a layered conductive film in which tungsten is layered over tantalum nitride.

Over the gate line 110 and the first dummy line 130, a gate insulating film 220 made of a TEOS film or a silicon oxide film, and an interlayer insulating film 230 made of a silicon oxide film or a silicon nitride film are formed. On the interlayer insulating film 230, a data line 140 and a second dummy line 160 made of a second conductive film and extending in a vertical direction are formed in the same layer and in parallel with each other. The second conductive film is composed of a low-resistance metal such as aluminum, titanium, molybdenum, copper, or silver, or an alloy or compound of such metals. Alternatively, the second conductive film can be, for example, a layered conductive film having a structure in which titanium, aluminum, and titanium are layered in this order from the bottom.

Over the data line 140 and the second dummy line 160, an interlayer insulating film 240 made of a silicon oxide film, silicon nitride film, photosensitive acrylic resin, or an SOG (Spin On Glass) film or the like is formed. On the interlayer insulating film 240, at a location corresponding to the first dummy line 130, a first sensor line 120, which is narrower than the first dummy line 130, is arranged such that it is disposed not to extend beyond the width of the first dummy line 130 when observed in a plan view. On the interlayer insulating film 240, at a location corresponding to the data line 140, a second sensor line 150, which is narrower than the data line 140, is arranged not to extend beyond the width of the data line 140 when observed in a plan view.

Both the first sensor line 120 and the second sensor line 150 are formed of a third conductive film, extending respectively in the horizontal and vertical directions in the same layer. In order to prevent short-circuits between the first sensor line 120 and the second sensor line 150 at their intersection, the first sensor line 120 is constituted of one continuous conductive body, and the second sensor line 150 is constituted of two conductive bodies 151 and 152, which are separate to sandwich the first sensor line 120. Alternatively, the first sensor line 120 may be constituted of two separate conductive bodies, and the second sensor line 150 may be constituted of one continuous conductive body. The third conductive film is a multi-layered conductive film having structures in which molybdenum is layered over aluminum, IZO (Indium Zinc Oxide) is layered over aluminum, an alloy of molybdenum and niobium is layered over aluminum, or the like.

Over the first and the second sensor lines 120 and 150, a protective insulating film 250 made of silicon oxide, silicon nitride, photosensitive acrylic resin, SOG (Spin On Glass) film, or the like is formed. Over the protective insulating film 250, conductive pad sections 320 and 370 are formed in the same layer made of a fourth conductive film of which the pixel electrode (not shown) is also made. The pad section 320 is electrically connected to the first sensor line 120 through the contact hole 310, and functions as the first sensor electrode 300 shown in FIG. 2. The pad section 370 is connected to the separate two conductive bodies 151 and 152 of the second sensor line 150 through two contact holes 361 and 362, electrically connecting the two separate conductive bodies 151 and 152 over the protective insulating film 250, and functions as the second sensor electrode 350 shown in FIG. 2. The pad section 370 is also referred to as "connecting body." The pad section 320 may also be referred to as "first pad section," and the pad section 370 may also be referred to as "second pad section."

Because the pad section 320 and the pad section 370 are both formed over the protective insulating film 250, which is the top layer of the TFT substrate 30, the distances from the respective pad sections to the common electrode formed on the surface of the sensor spacer of the CF substrate 40, which is described later, are equal. As a result, when the surface of the CF substrate 40 is pressed, the common electrode formed on the sensor spacer touches the pad section 320 and the pad section 370 simultaneously, and therefore the display element section 11 as a touch sensor can reliably detect the location of a touch.

The pad section 370 can also function as a jumper. Using pad section 370, the separate conductive bodies 151 and 152 can electrically be connected, and therefore the first sensor line 120 and the second sensor line 150 can be formed of a conductive film of the same layer. Here, if the first sensor line 120 and the second sensor line 150 are to be formed of conductive films of different layers, two layers of conductive films will be necessary. By using the pad section 370 as a jumper, however, the first sensor line 120 and the second sensor line 150 can be formed only of one layer of conductive film. Consequently, conductive films that are no longer used to form sensor lines can be used to form other wiring, which increases the flexibility in the wiring layout.

The fourth conductive film is made of a transparent conductive film of ITO (Indium Tin Oxide), IZO, or the like, or made of a reflective film of aluminum or the like. For planarization of the protective insulating film 250 surface, the protective insulating film 250 may be formed of two layers of insulating films, with the lower insulating film made of a resin such as polyimide or a planarizing film made of an SOG film or the like.

Also, in the present embodiment, both the first and the second sensor lines 120 and 150 are formed of the third conductive film, and therefore the depths from the surface of the protective insulating film 250 to the first sensor line 120 and to the second sensor line 150 are the same. Consequently, relay pads do not need to be provided when the contact holes 310, 361, and 362 are opened, and therefore the aperture ratio of the display element section 11 can be improved.

Next, a CF substrate 40 is described. On the insulating substrate 400, at a location corresponding to a pixel electrode 80 of respective display element sections 11, a red, green or blue color filter 410 is formed, and also a black matrix 420 made of a light-shielding material such as resin is formed, surrounding the color filter 410. A sensor spacer 430 made of acrylic resin and having a large film thickness is formed at a location corresponding to pad sections 320 and 370 on the TFT substrate 30. The black matrix 420 is also formed between the sensor spacer 430 and the insulating substrate 400 to prevent leakage of light from the backlight. A common electrode 440 made of transparent conductive film such as ITO and IZO is formed over the surfaces of the sensor spacer 430 and the color filter 410. As a result, the common electrode 440 protrudes over the location where the sensor spacer 430 is formed. The sensor spacer 430 with the common electrode 440 formed thereon is referred to as "pressing electrode 50."

The TFT substrate 30 and the CF substrate 40 described above face each other with a liquid crystal sandwiched between them, and the pad sections 320 and 370 and the sensor spacer 430 are disposed with a prescribed distance apart. Here, the prescribed distance refers to a distance that allows the common electrode 440 on the sensor spacer 430 to touch the pad sections 320 and 370 when the surface of the CF electrode 40 is pressed.

In the display element section 11, an interlayer insulating film 230 is formed over the gate insulating film 220 to reduce the wiring cross capacitance at the intersection of the gate line 110 and the data line 140. However, if the delay of the signals provided through the gate line 110 or the data line 140 is small enough that it can be ignored, the interlayer insulating film 230 may be omitted. In this case, because the manufacturing process of the TFT substrate 30 can be simplified, the production costs can be reduced.

If TFT 70 formed in the display element section 11 is a top-gate type TFT whose channel portion is formed of polycrystalline silicon, the characteristics of TFT 70 become unstable unless the dangling bonds of polycrystalline silicon in the interface with the gate insulating film 220 are terminated with hydrogen. Also, for the gate insulating film 220 of polycrystalline silicon TFT, a high-quality TEOS film must to be used. However, because the TEOS film does not contain hydrogen, the dangling bonds cannot be terminated. To solve the problem, silicon nitride film generated by plasma CVD is used as the interlayer insulating film 230. In this case, dangling bonds in the channel portion can be terminated with hydrogen contained in the silicon nitride film, and therefore characteristics of the polycrystalline silicon TFT can be stabilized.

In the display element section 11 of the present embodiment, a first dummy line 130, which extends in the horizontal direction, and a second dummy line 160, which extends in the vertical direction, are formed. Alternatively, however, only one of the first dummy line 130 or the second dummy line 160 may be formed. In this case, the location of a touch in the direction in which a dummy line is not formed is identified as explained in detail in the description of Embodiment 5 below.

2.4 Effects

As described above, in the touch panel incorporating a display device of the present embodiment, the first sensor line 120 and the second sensor line 150 are disposed at locations respectively corresponding to the first dummy line 130 and the data line 140 on the interlayer insulating film 240 such that the first sensor line 120 and the second sensor line 150 are disposed not to extend beyond the width of the first dummy line 130 and the width of data line 140, respectively, when observed in a plan view. This arrangement improves the aperture ratio of the display element section 11.

Because both the first sensor line 120 and the second sensor line 150 are formed of the third conductive film, the depths from the surface of the protective insulating film 250 to the first sensor line 120 and to the second sensor line 150 are equal, and the depths of the contact holes 310, 361, and 362 are also equal. This configuration eliminates the need for relay pads used in the basic study. As a result, the aperture ratio of the display element section 11 can further be improved, and the manufacturing process can be simplified.

Also, by using the pad section 370, which can also function as a jumper, the first sensor line 120 and the second sensor line 150 can be made of a conductive film of the same layer. Consequently, compared to the case where the first sensor line 120 and the second sensor line 150 are made of conductive films of different layers, the number of the layers of conductive films can be reduced. As a result, the conductive film that is no longer used to form sensor lines can be used to form other wiring, which improves the flexibility in the wiring layout.

2.5 Modification Example 1

Figure 6:
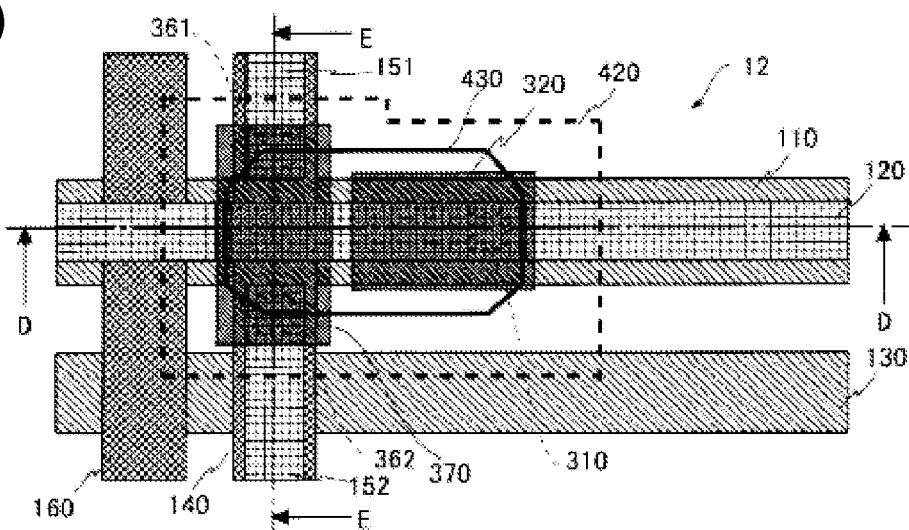
FIG. 6(A) is a plan view showing a part of the pattern arrangement in a display element section of the touch panel incorporating a liquid crystal display device according to Modification Example 1 of Embodiment 1.
FIG. 6(B) is a cross-sectional view of the display element section, taken along the line D-D of FIG. 6(A).
FIG. 6(C) is a cross-sectional view of the display element section, taken along the line E-E of FIG. 6(A).
Figure 6:
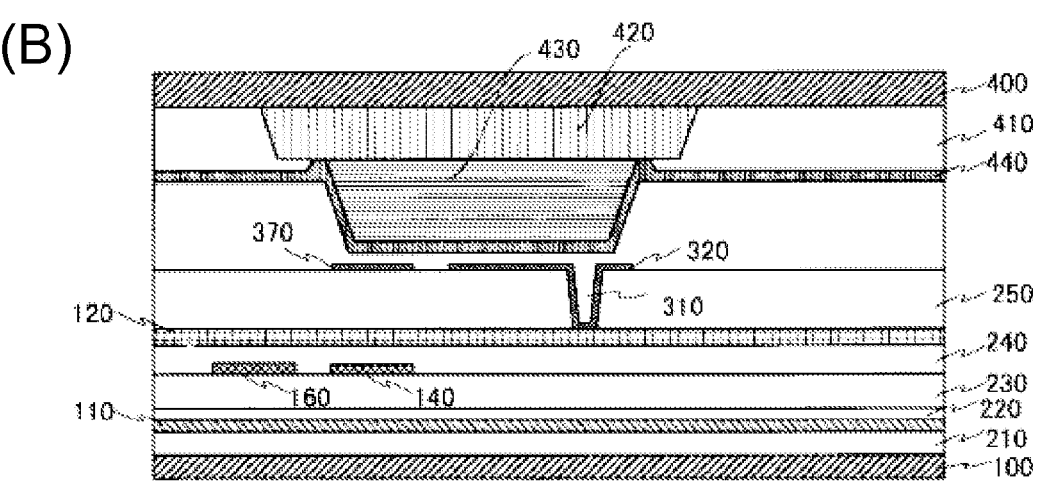
Figure 6:
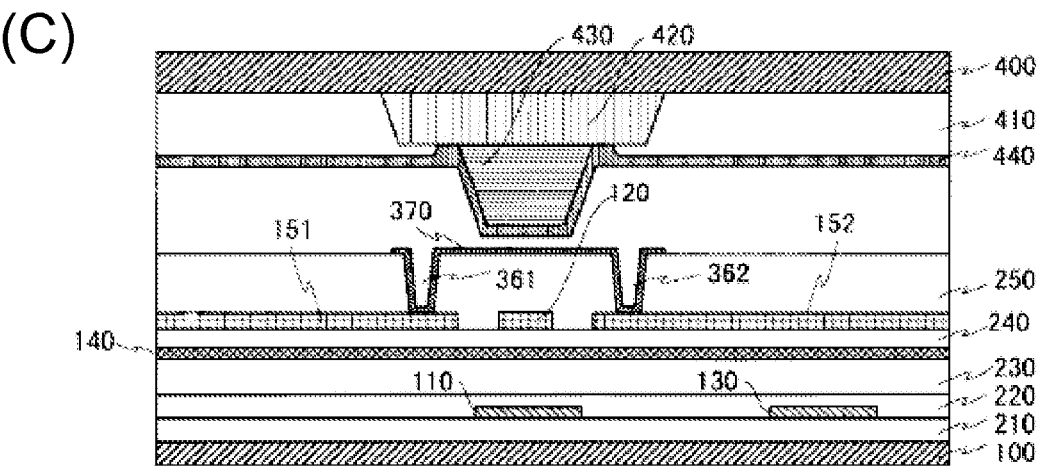

FIG. 6(A) is a plan view showing the pattern arrangement of the display element section of a touch panel incorporating a liquid crystal display device according to Modification Example 1 of Embodiment 1. FIG. 6(B) is a cross-sectional view of the display element section, taken along the line D-D of FIG. 6(A). FIG. 6(C) is a cross-sectional view of the display element section, taken along the line E-E of FIG. 6(A). Here, for the display element section 12 shown in FIG. 6, the same reference characters are provided for constituting elements identical or corresponding to those of the display element section 11 shown in FIG. 5, and mainly differences from the display element section 11 are described.

As shown in FIG. 6, in the display element section 12, the positions of the first dummy line 130 and the gate line 110 of display element section 11 shown in FIG. 5 are switched. Also, the first sensor line 120 is formed of the third conductive film such that its width is narrower than the gate line 110, and is disposed at a location corresponding to the gate line 110 on the interlayer insulating film 240 such that it does not extend beyond the width of the gate line 110 when observed in a plan view. The effects of the touch panel incorporating a liquid crystal display device according to the embodiment described above is similar to those of the touch panel incorporating a liquid crystal display device according to Embodiment 1, and therefore the explanation of such effects is omitted.

2.6 Modification Example 2

Figure 7:
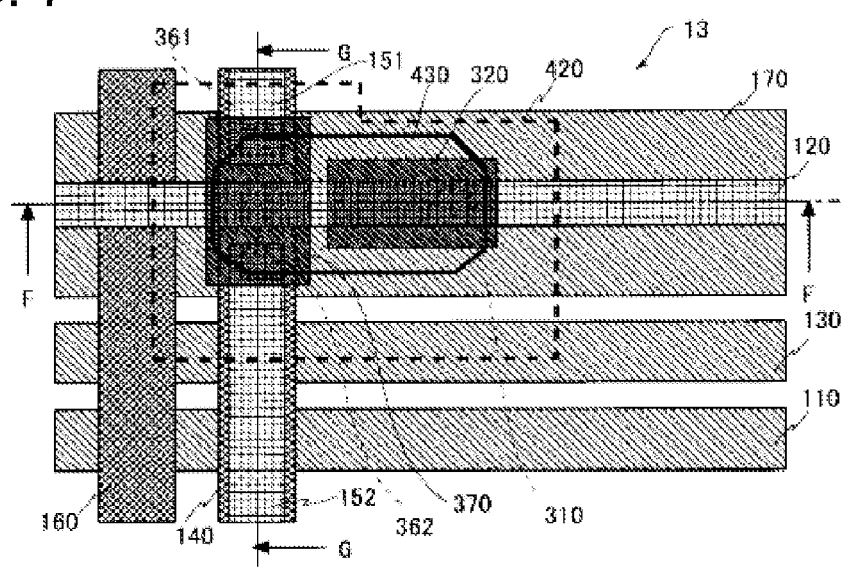
FIG. 7(A) is a plan view showing a part of the pattern arrangement in a display element section of the touch panel incorporating a liquid crystal display device according to Modification Example 2 of Embodiment 1.
FIG. 7(B) is a cross-sectional view of the display element section, taken along the line F-F of FIG. 7(A).
FIG. 7(C) is a cross-sectional view of the display element section, taken along the line G-G of FIG. 7(A).
Figure 7:
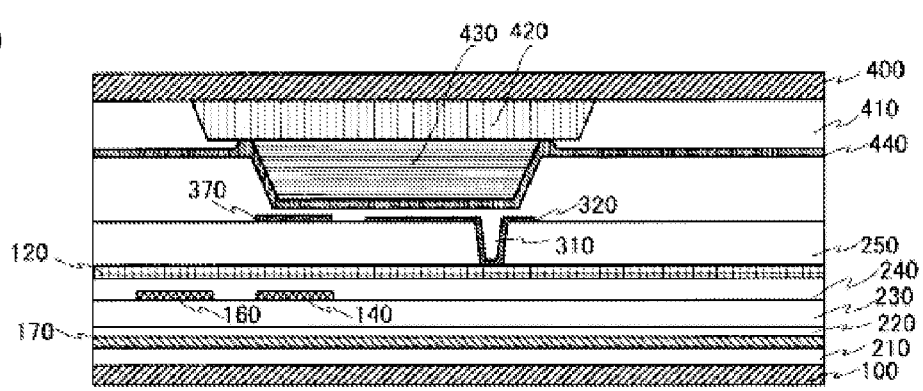
Figure 7:
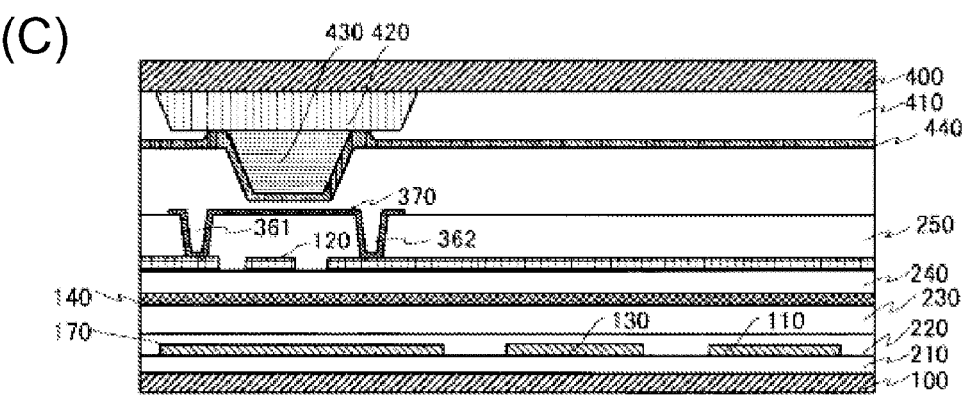

FIG. 7(A) is a plan view showing a part of the pattern arrangement of a display element section of a touch panel incorporating a liquid crystal display device according to Modification Example 2 of Embodiment 1. FIG. 9(B) is a cross-sectional view of the display element section, taken along the line F-F of FIG. 7(A). FIG. 7(C) is a cross-sectional view of display element section, taken along the line G-G of FIG. 7(A). Here, for a display element section 13 shown in FIG. 7, the same reference characters are provided for constituting elements identical or corresponding to those of the display element section 11 according to Embodiment 1 shown in FIG. 5, and mainly differences from the display element section 11 are described.

Unlike the display element section 11 shown in FIG. 5, the display element section 13, as shown in FIG. 7, includes not only the first dummy line 130 and the gate line 110, but also an auxiliary capacitance line 170 on the base insulating film 210. The auxiliary capacitance line 170 is formed of the first conductive film, is arranged adjacent to the first dummy line 130, and extends in the horizontal direction. The auxiliary capacitance line 170 is a wiring connected to an auxiliary capacitance electrode (not shown) that faces a part of the pixel electrode 80, and has a width wider than the width of the gate line 110 or the first dummy line 130 to accommodate the flow of a large current.

A first sensor line 120 is made of a third conductive film and is disposed on the interlayer insulating film 240 such that it does not extend beyond the width of the auxiliary capacitance line 170 when observed in a plan view. By forming the first sensor line 120 over the auxiliary capacitance line 170, the aperture ratio of the display element section 13 can be improved. Other effects are similar to those of the touch panel incorporating a liquid crystal display device according to Embodiment 1, and therefore explanation on them is omitted. Here, the second sensor line may be formed of a single conductive body, and the first sensor line may be formed of two separate conductive bodies.

In the display element section 13, the sensor spacer 430 cannot be formed sufficiently away from the pixel electrode, because the auxiliary capacitance line 170 is not wide enough. As a result, when the auxiliary capacitance line 170 is utilized also as a black matrix, the light from the backlight leaks from the sensor spacer 430, degrading the viewability of the displayed image. For this reason, a black matrix 420 must be provided on the sensor spacer 430.

2.7 Modification Example 3

Figure 8:
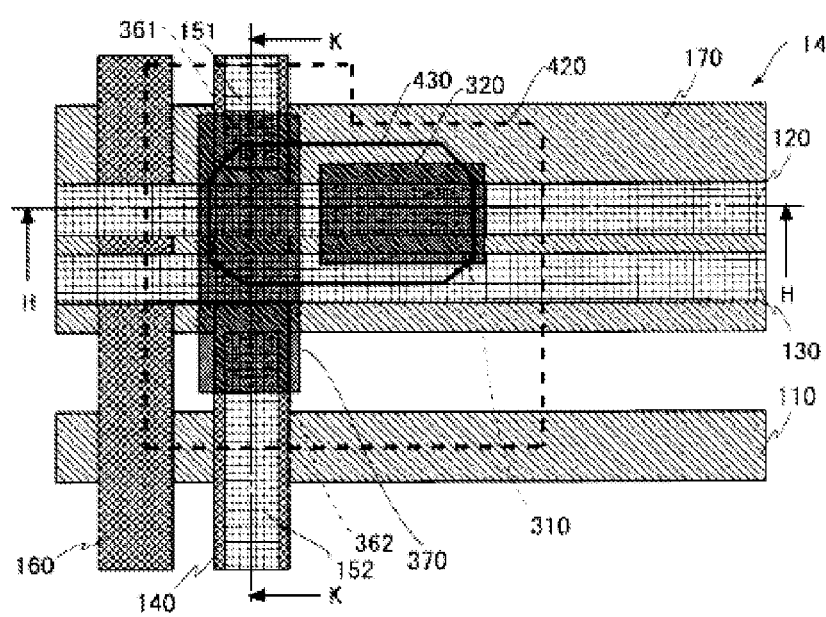
FIG. 8(A) is a plan view showing a part of the pattern arrangement in a display element section of the touch panel incorporating a liquid crystal display device according to Modification Example 3 of Embodiment 1.
FIG. 8(B) is a cross-sectional view of the display element section, taken along the line H-H of FIG. 8(A).
FIG. 8(C) is a cross-sectional view of the display element section, taken along the line K-K of FIG. 8(A).
Figure 8:
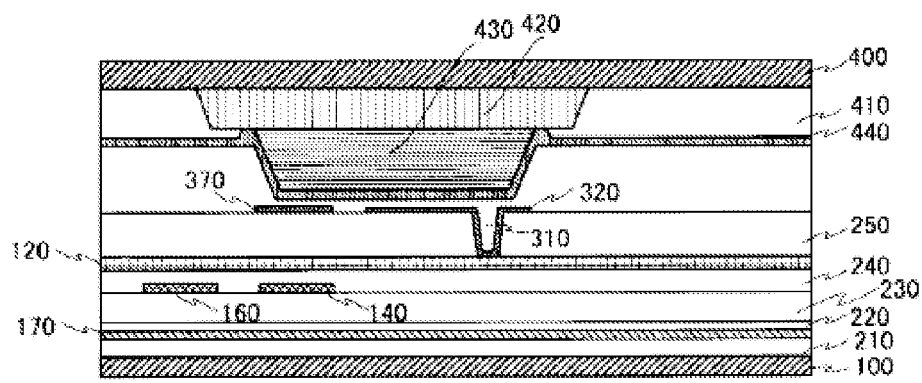
Figure 8:
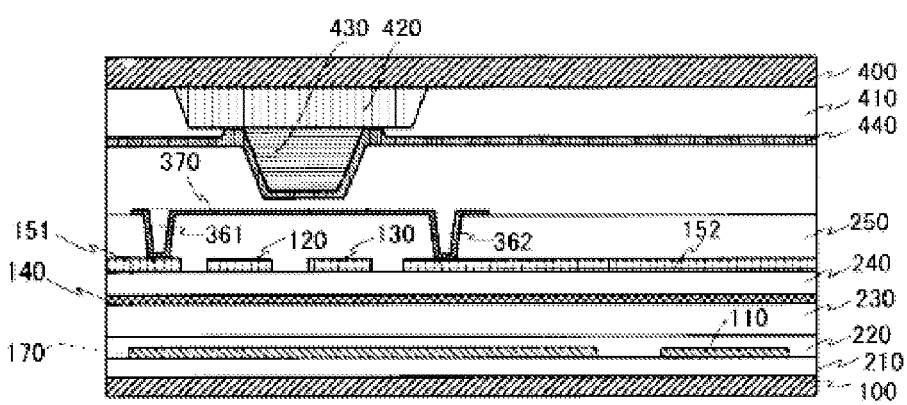

FIG. 8(A) is a plan view showing a part of the pattern arrangement in a display element section of a touch panel incorporating a liquid crystal display device according to Modification Example 3 of Embodiment 1. FIG. 8(B) is a cross-sectional view of the display element section, taken along the line H-H of FIG. 8(A). FIG. 8(C) is a cross-sectional view of the display element section, taken along the line K-K of FIG. 8(A). Here, for the display element section 14 shown in FIG. 8, the same reference characters are provided for constituting elements identical or corresponding to those of the display element section 13 of Modification Example 2 shown in FIG. 7, and mainly differences from the display element section 13 are described.

In the display element section 13 shown in FIG. 7, only the first sensor line 120 is formed on the interlayer insulating film 240 at a location corresponding to the auxiliary capacitance line 170. Here, however, as shown in FIG. 8, a first dummy line 130 is also provided on the interlayer insulating film 240 at a location corresponding to the auxiliary capacitance line 170 such that it does not extend beyond the width of the auxiliary capacitance line 170 when observed in a plan view. The first dummy line 130, as in the case with the first sensor line 120, is formed of the third conductive film, adjacent to and parallel with the first sensor line 120.

As explained above, in the touch panel incorporating a liquid crystal display device according to the embodiments described above, the auxiliary capacitance line 170 is required. Consequently, the aperture ratio of the display element section 14 can further be improved by forming the first sensor line 120 and the first dummy line 130 over the auxiliary line 170. Other effects are similar to those of the touch panel incorporating a liquid crystal display device according to Embodiment 1, and therefore explanation of such effects is omitted. Also, the second sensor line may be formed of a single conductive body, and the first sensor line may be formed of two separate conductive bodies.

3. Embodiment 2

3.1 Configuration of the Display Element Section

Figure 9:
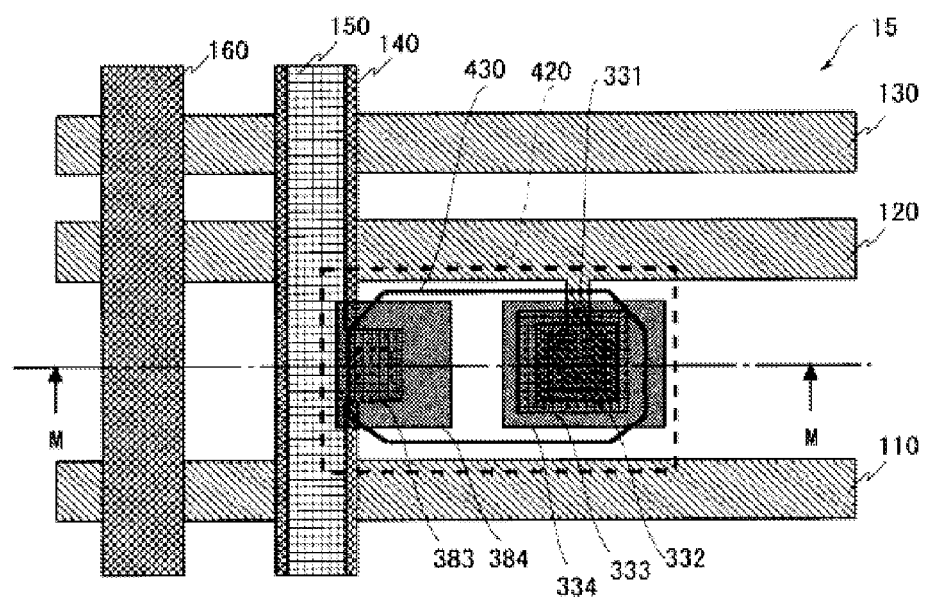
FIG. 9(A) is a plan view showing a part of the pattern arrangement in a display element section of the touch panel incorporating a liquid crystal display device according to Embodiment 2 of the present invention.
FIG. 9(B) is a cross-sectional view of the display element section, taken along the line M-M of FIG. 9(A).
Figure 9:
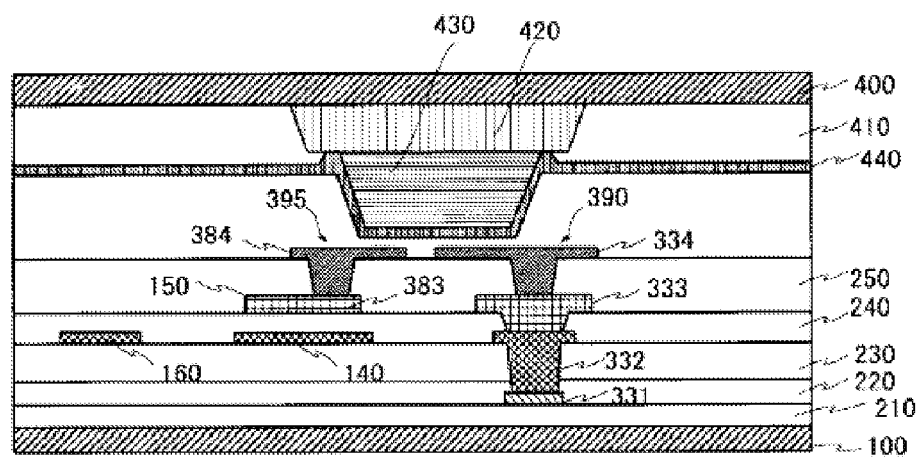

FIG. 9(A) is a plan view showing a part of the pattern arrangement of a display element section of a touch panel incorporating a liquid crystal display device according to Embodiment 2. FIG. 9(B) is a cross-sectional view of the display element section, taken along the line M-M of FIG. 9(A). Here, for the display element section 15 shown in FIG. 9, the same reference characters are provided for constituting elements identical or corresponding to those of the display element section 11 of Embodiment 1, and mainly differences from the display element section 11 are described.

In the display element section 15, a first sensor line 120 is formed between the first dummy line 130 and the gate line 110 formed on the base insulating film 210 of the display element section 11. The first sensor line 120 is formed of the first conductive film, of which the first dummy line 130 and the gate line 110 are also formed, and is formed to extend in the horizontal direction.

As in the case with the display element section 11, a second sensor line 150 is disposed on the interlayer insulating film 240 at a location corresponding to the data line 140. The second sensor line 150 is formed of the third conductive film, and is disposed such that it does not extend beyond the width of the data line 140 when observed in a plan view. This configuration improves the aperture ratio of the display element section 15. Also, because the first sensor line 120 is formed of the first conductive film, and the second sensor line 150 is formed of the third conductive film, no short-circuiting should occur at the intersection of the lines. For this reason, the second sensor line 150, like the first sensor line 120, is formed of a single conductive body.

Next, the configurations of first and the second pad electrodes 390 and 395 are described. The first pad electrode 390 functions as the first sensor electrode 300 shown in FIG. 2, and the second pad electrode 395 functions as the second sensor electrode 350 shown in FIG. 2. Unlike in Embodiment 1, in the present embodiment, the depth from the surface of the protective insulating film 250 to the first sensor line 120 is deeper than the depth to the second sensor line 150. As a result, if two respective contact holes leading to the first and the second sensor lines 120 and 150 are to be opened simultaneously after the protective insulating film 250 is formed, the following problem occurs. That is, when the contact hole leading to the second sensor line 150 is opened, no contact hole has been opened for the first sensor line 120, and therefore etching needs to be continued. However, continued etching makes the second sensor line 150 over-etched, reducing its film thickness. This problem can be solved by using a relay pad discussed in the description of the basic study, but the use of the relay pad lowers the aperture ratio. In order to solve the problem, in the present embodiment, the first and the second pad electrodes 390 and 395 are formed as described below. In the following description, constituting elements of the first and the second pad electrodes 390 and 395 are described, and explanation of constituting elements that are not directly related to the first and the second pad electrodes 390 and 395 is omitted.

First, on the base insulating film 210 formed on the insulating substrate 100, a first sensor line 120 is formed of the first conductive film, and a third pad wiring 331 is formed to branch off from the first sensor line 120 towards the gate line 110. Next, gate insulating film 220 and the interlayer insulating film 230 are layered, and contact holes leading to the third pad wiring 331 are formed in the gate insulating film 220 and the interlayer insulating film 230, using the photolithographic technology. A second conductive film is layered and is processed by photolithographic technology to form a conductive pad 332 connected to the third pad wiring 331. An interlayer insulating film 240 is layered, and a contact hole leading to the conductive pad 332 is formed.

Then, a third conductive film is formed on the interlayer insulating film 240, and the third conductive film is processed by photolithographic technology to form a conductive pad 333 connected to the conductive pad 332. At this time, a fourth pad wiring 383 that branches off from the second sensor line 150 to the side opposite to the second dummy line 160 is formed simultaneously. Next, a protective insulating film 250 is layered, and contact holes leading to the conductive pad 333 and to the fourth pad wiring 383 are formed. A fourth conductive film is layered and processed by photolithographic technology to form a conductive pad 334 connected to the conductive pad 333, and a conductive pad 384 connected to the fourth pad wiring 383 are formed.

In the display element section 15 according to the present embodiment, the first dummy line 130 extending in the horizontal direction and the second dummy line 160 extending in the vertical direction are formed. Alternatively, however, only one dummy line, either the first dummy line 130 or the second dummy line 160, can be formed. In this case, the location of a touch in the direction in which a dummy line is not formed is identified as explained in detail in the description of Embodiment 5 below.

In this manner, the first pad electrode 390 connected to the first sensor line 120 and composed of the third pad wiring 331 and the conductive pads 332 to 334, and the second pad electrode 395 connected to the second sensor line 150 and composed of the fourth pad wiring 383 and the conductive pad 384 are formed.

3.2 Effects

In the touch panel incorporating a liquid crystal display device according to the embodiment described above, the second sensor line 150 is formed on the interlayer insulating film 240 at a location corresponding to the data line 140, and the second sensor line 150 is arranged such that it does not extend beyond the width of the data line 140 when observed in a plan view. This configuration improves the aperture ratio of the display element section 15.

The depth from the surface of the protective insulating film 250 to the first sensor line 120 is deeper than the depth to the second sensor line 150. However, by layering the third pad wiring 331 and the conductive pads 332 to 334 together, and by layering the fourth pad wiring 383 and the conductive pad 384 together, the heights of the first pad electrode 390 and of the second pad electrode 395 become equal. Consequently, when the surface of the CF substrate 40 is pressed, the common electrode 440 formed on the surface of the sensor spacer 430 touches the first pad electrode 390 and the second pad electrode 395 simultaneously. This configuration allows the display element section 15 as a touch sensor to reliably identify the location of the touch. Further, this configuration eliminates the need to use relay pads for preventing the second sensor line 150 from being etched and losing the film thickness. As a result, the aperture ratio of the display element section 15 can further be improved.

3.3 Modification Example 1

Figure 10:
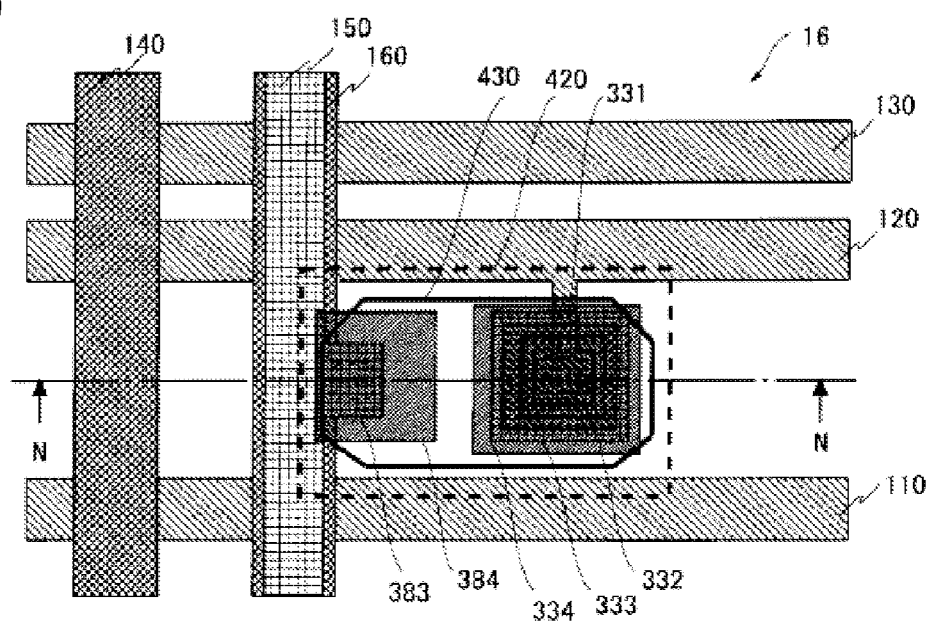
FIG. 10(A) is a plan view showing a part of the pattern arrangement in a display element section of the touch panel incorporating a liquid crystal display device according to Modification Example 1 of Embodiment 2.
FIG. 10(B) is a cross-sectional view of the display element section, taken along the line N-N of FIG. 10(A).
Figure 10:
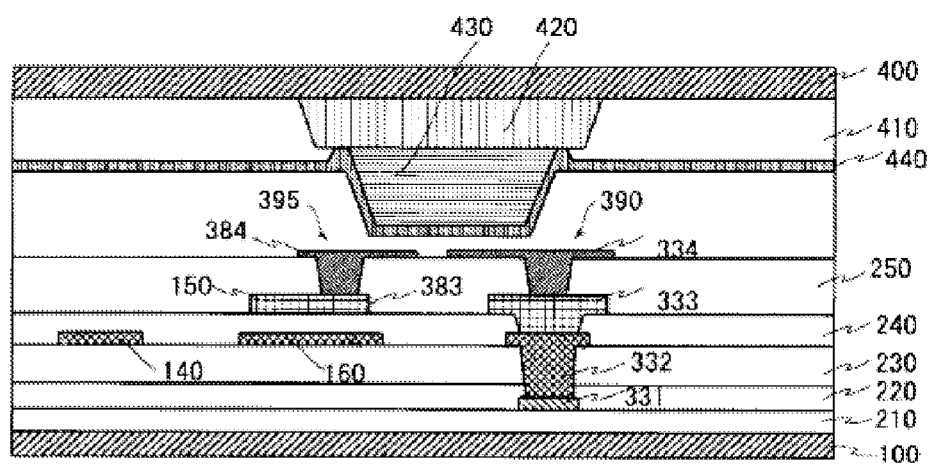

FIG. 10(A) is a plan view showing a part of the pattern arrangement of a display element section of a touch panel incorporating a liquid crystal display device according to Modification Example 1 of Embodiment 2. FIG. 10(B) is a cross-sectional view of the display element section, taken along the line N-N of FIG. 10(A). Here, for a display element section 16 shown in FIG. 10, the same reference characters are provided for constituting elements identical or corresponding to those of the display element section 15 according to Embodiment 2 shown in FIG. 9, and mainly differences from the display element section 15 are described.

As shown in FIG. 10, in the display element section 16, the positions of the second dummy line 160 and the data line 140 in the display element section 15 shown in FIG. 9 are switched. Further, the second sensor line 150 is formed of the third conductive film on the interlayer insulating film 240 at a location corresponding to the second dummy line 160 such that it does not extend beyond the width of the second dummy line 160 when observed in a plan view. The effects of such touch panel incorporating a liquid crystal display device are similar to those of the touch panel incorporating a liquid crystal display device according to Embodiment 2, and therefore explanation of such effects is omitted.

3.4 Modification Example 2

Figure 11:
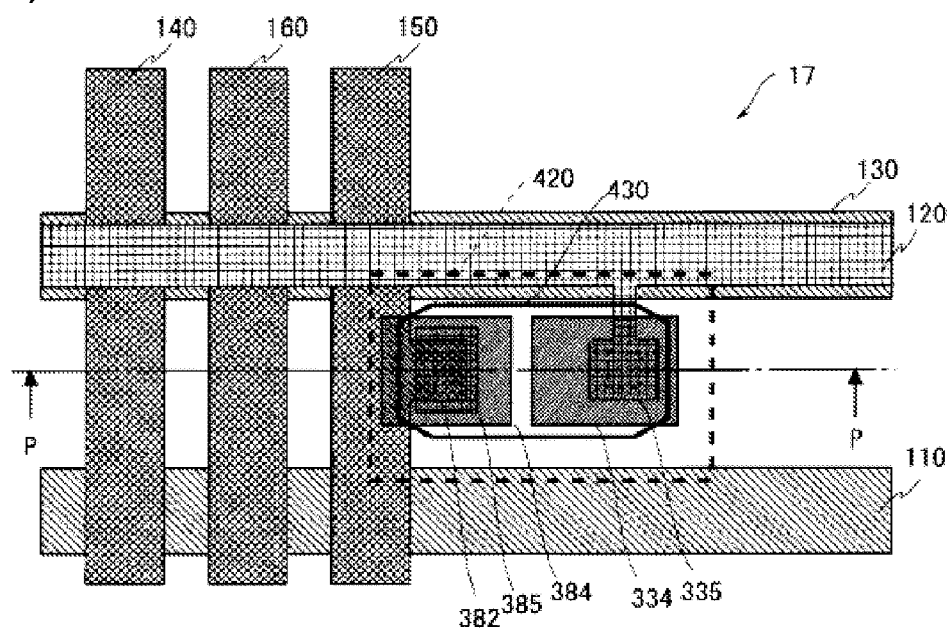
FIG. 11(A) is a plan view of a part of the pattern arrangement in a display element section of the touch panel incorporating a liquid crystal display device according to Modification Example 2 of Embodiment 2.
FIG. 11(B) is a cross-sectional view of the display element section, taken along the line P-P of FIG. 11(A).
Figure 11:
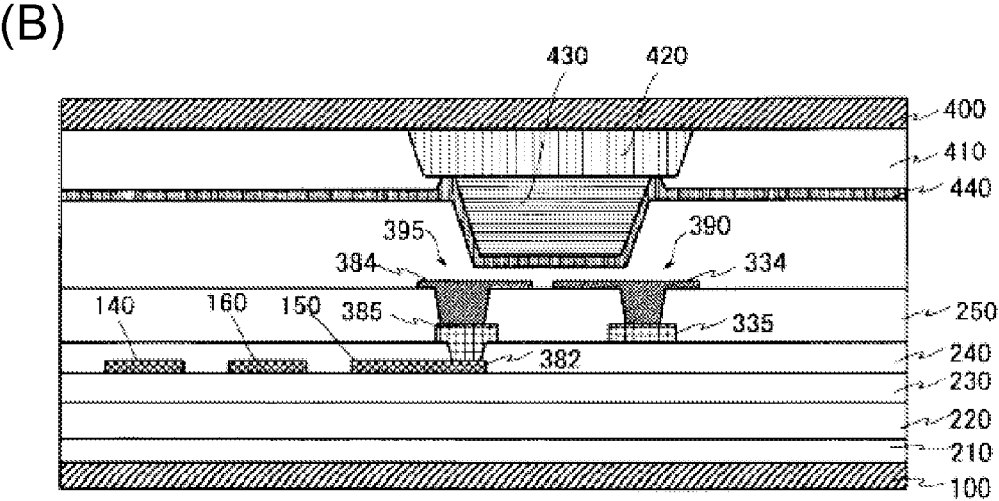

FIG. 11(A) is a plan view showing a part of the pattern arrangement of the touch panel incorporating a liquid crystal display device according to Modification Example 2 of Embodiment 2. FIG. 11(B) is a cross-sectional view of the display element section, taken along the line P-P of FIG. 11(A). Here, for a display element section 17 shown in FIG. 11, the same reference characters are provided for constituting elements identical or corresponding to those of the display element section 16 according to Modification Example 1 shown in FIG. 10, and mainly differences from the display element section 16 are described.

In the display element section 16 shown in FIG. 10, the first sensor line 120 is made of the first conductive film, and formed between the first dummy line 130 and the gate line 110. However, in the display element section 17 shown in FIG. 11, the first sensor line 120 is formed of the third conductive film, and arranged on the interlayer insulating film 240 at a location corresponding to the first dummy line 130 such that it does not extend beyond the width of the first dummy line 130 when observed in a plan view. In the display element section 16, the second sensor line 150 is made of the third conductive film and is arranged on the interlayer insulating film 240 at a location corresponding to the second dummy line 160. In the display element section 17, the second sensor line 150 is, like the second dummy line 160, made of the second conductive film, and is arranged adjacent to and in parallel with the second dummy line 160, on the side opposite from the data line 140. Effects of such touch panel incorporating a liquid crystal display device are similar to those of the touch panel incorporating a liquid crystal display device according to Embodiment 2, and therefore explanation of such effects is omitted.

Also, in the display element section 17, the depths from the surface of the protective insulating film 250 to the fifth pad wiring 335 connected to the first sensor line 120, and to the sixth pad wiring 382 connected to the second sensor line 150 are different. Consequently, if a contact hole leading to the fifth pad wiring 335 and a contact hole leading to the sixth pad wiring 382 are opened simultaneously by etching, the contact hole leading to the fifth pad wiring 335 is opened first, which creates a problem that the film thickness of the fifth pad wiring 335 is reduced.

To solve the problem, a conductive pad 334 made of the fourth conductive film is layered over a fifth pad wiring 335, which is formed on the interlayer insulating film 240 and branching off from the first sensor line 120 towards the gate line 110, to form a first pad electrode 390. Also, a second pad electrode 395 is formed by layering a sixth pad wiring 382, which branches off from the second sensor line 150 disposed on the interlayer insulating film 230 and made of the second conductive film into the direction opposite from the second dummy line 160, a conductive pad 385 made of the third conductive film, and a conductive pad 384 made of the fourth conductive film. This configuration allows the first pad electrode 390 and the second pad electrode 395 to have the same height. As a result, when the surface of the CF substrate 400 is pressed, the common electrode 440 formed on the surface of the sensor spacer 430 touches the first pad electrode 390 and the second pad electrode 395 simultaneously. In this manner, the display element section 17 as a touch sensor can reliably identify the location of a touch. Also, because relay pads do not need to be used to form the first and the second pad electrodes 390 and 395, the aperture ratio of the display element section 17 can further be improved.

3.5 Modification Example 3

Figure 12:
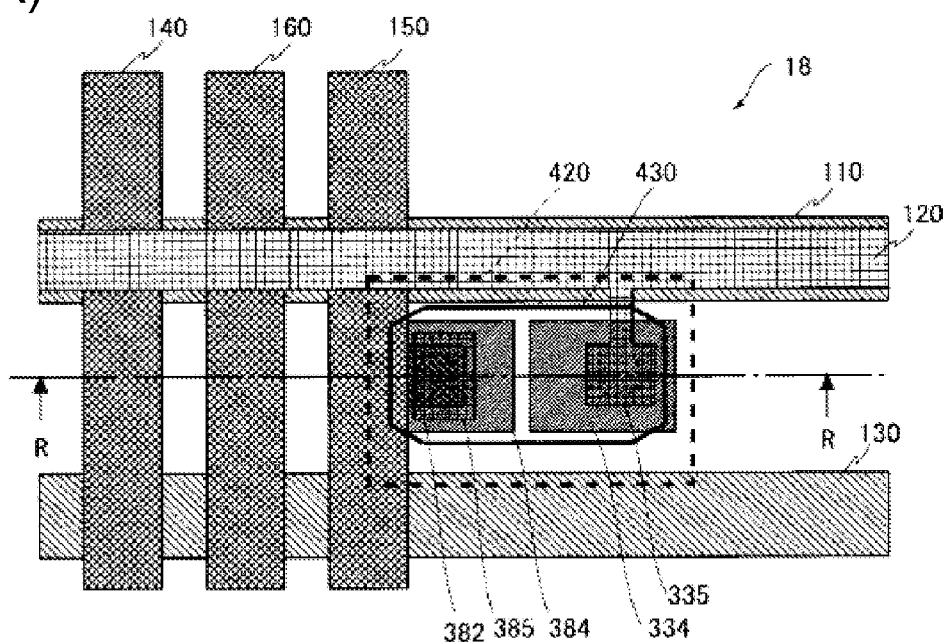
FIG. 12(A) is a plan view showing a part of the pattern arrangement in a display element section of the touch panel incorporating a liquid crystal display device according to Modification Example 3 of Embodiment 2.
FIG. 12(B) is a cross-sectional view of the display element section, taken along the line R-R of FIG. 12(A).
Figure 12:
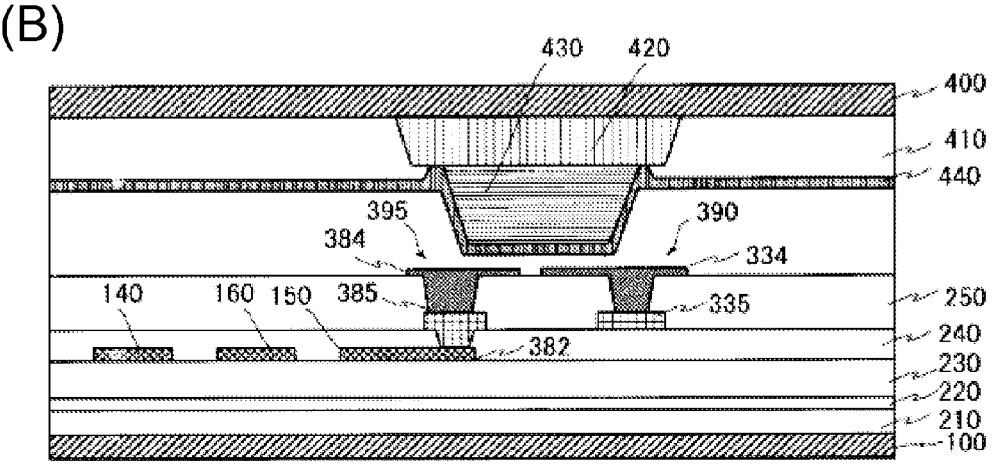

FIG. 12(A) is a plan view showing a part of the pattern arrangement of a display element section of a touch panel incorporating a liquid crystal display device according to Modification Example 3 of Embodiment 2. FIG. 12(B) is a cross-sectional view of the display element section, taken along the line R-R of FIG. 12(A). Here, for a display element section 18 shown in FIG. 12, the same reference characters are provided for constituting elements identical or corresponding to those of the display element section 17 according to Modification Example 2 shown in FIG. 11, and mainly differences from the display element section 17 are described.

As shown in FIG. 12, in the display element section 18, the positions of the first dummy line 130 and the gate line 110 in the display element section 17 are switched, and the first sensor line 120 is formed of the third conductive film and arranged on the interlayer insulating film 240 at a location corresponding to the gate line 110 such that it does not extend beyond the width of the gate line 110 when observed in a plan view. Effects of such touch panel incorporating a liquid crystal display device are similar to those of the touch panel incorporating a liquid crystal display device according to Modification Example 2 of Embodiment 2, and therefore explanation of such effects are omitted.

4. Embodiment 3

Figure 13:
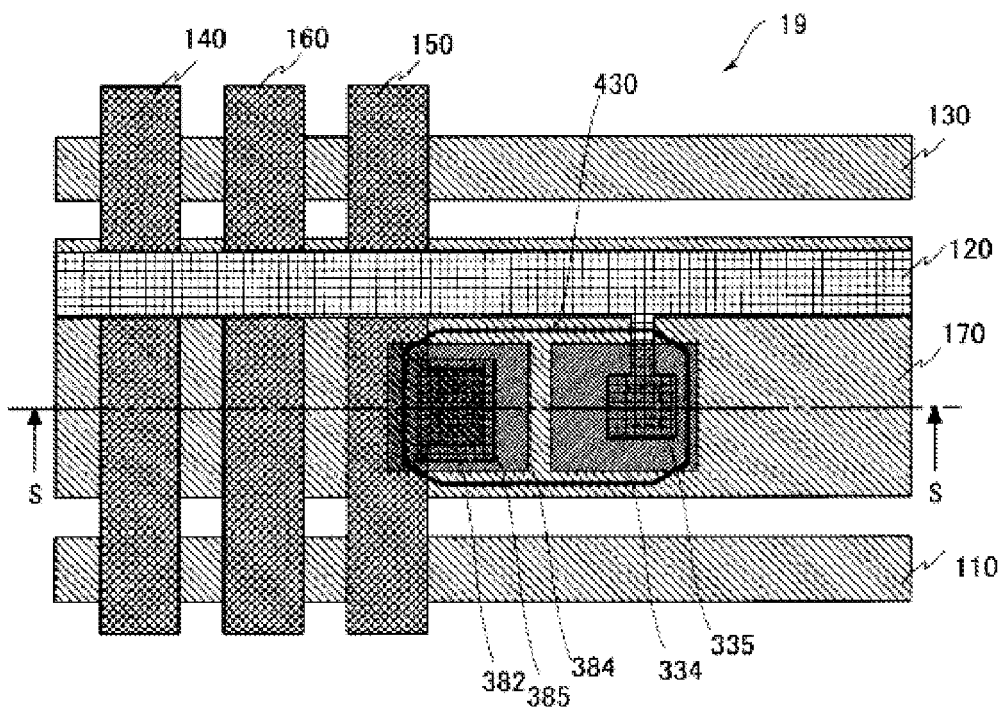
FIG. 13(A) is a plan view showing a part of the pattern arrangement in a display element section of the touch panel incorporating a liquid crystal display device according to Embodiment 3 of the present invention.
FIG. 13(B) is a cross-sectional view of the display element section, taken along the line S-S of FIG. 13(A).
Figure 13:
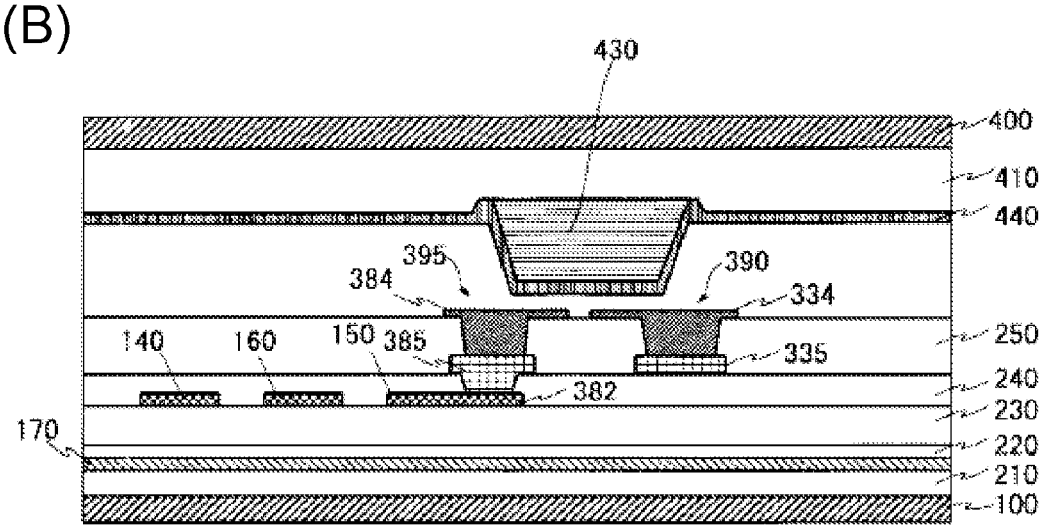

FIG. 13(A) is a plan view showing a part of the pattern arrangement of a display element section of a touch panel incorporating a liquid crystal display device according to Embodiment 3 of the present invention. FIG. 13(B) is a cross-sectional view of the display element section, taken along the line S-S of FIG. 13(A). Here, for a display element section 19 shown in FIG. 13, the same reference characters are provided for constituting elements identical or corresponding to those of the display element section 16 according to Modification Example 1 of Embodiment 2 shown in FIG. 10, and mainly differences from the display element section 16 are described.

Unlike the display element section 16 shown in FIG. 10, the display element section 19, as shown in FIG. 13, includes an auxiliary capacitance line 170 disposed between the first dummy line 130 and the gate line 110. The auxiliary capacitance line 170 is made of the first conductive film, has a wide width, and extends in the horizontal direction. A first sensor line 120 made of the third conductive film is arranged on the interlayer insulating film 240 at a location corresponding to the auxiliary capacitance line 170 such that it does not extend beyond the width of the auxiliary capacitance line 170 when observed in a plan view. A second sensor line 150, like the second dummy line 160, is made of the second conductive film, and is disposed in parallel with the second dummy line 160, on the side opposite from the data line 140. With the first sensor line 120 formed on the auxiliary capacitance line 170 in this manner, the aperture ratio of the display element section 19 can be improved.

The structures of the first pad electrode 390 and the second pad electrode 395 according to the present embodiment are respectively the same as the structures of the first pad electrode 390 and the second pad electrode 395 of the display element section 18 shown in FIG. 12. Descriptions of the structures and the effects of the first pad electrode 390 and the second pad electrode 395 are, therefore, omitted.

Unlike the case with Modification Examples 2 and 3 of Embodiment 2, in the present embodiment, the first sensor line 120 is formed of the third conductive layer and is disposed between the first and second pad electrodes 390 and 395 and an edge of the auxiliary capacitance line 170. Here, because the first and second pad electrodes 390 and 395 are away from the edge in the width direction of the auxiliary capacitance line 170 inwardly by the distance equivalent to the width of the first sensor line 120, the sensor spacer 430 can also be disposed away from the edge in the width direction of the auxiliary capacitance line 170 by a sufficient distance. The light from the backlight, therefore, is blocked by the auxiliary capacitance line 170. That is, by utilizing the auxiliary capacitance line 170 as a black matrix, the light from the backlight is prevented from passing through the sensor spacer 430 without the need to form a black matrix over the sensor spacer 430. This means that the process of forming a black matrix in the step of making the CF substrate 40 can be eliminated. The manufacturing step of the CF substrate 40 is therefore shortened, and the cost of manufacturing can be reduced accordingly.

In the display element section 19 of the present embodiment, a first dummy line 130 extending in the horizontal direction and a second dummy line 160 extending in the vertical direction are formed. Alternatively, however, only one of the first dummy line 130 or the second dummy line 160 may be formed. In this case, the location of a touch in the direction in which dummy line is not formed is identified as explained in detail in the description of Embodiment 5 below.

4.1 Modification Examples

Figure 14:
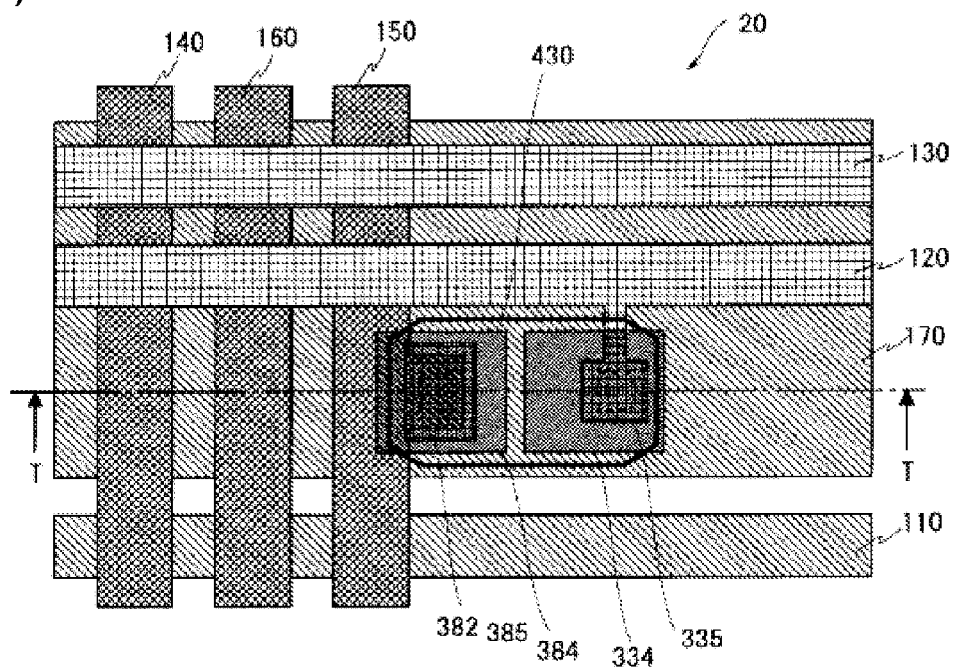
FIG. 14 is a plan view showing a part of the pattern arrangement in a display element section of the touch panel incorporating a liquid crystal display device according to a modification example of Embodiment 3.
Figure 14:
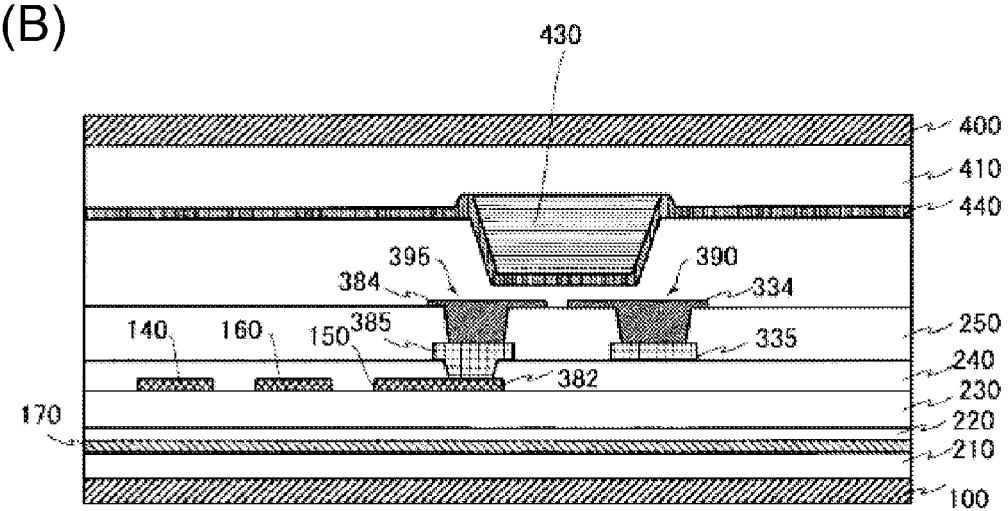

FIG. 14(A) is a plan view showing a part of the pattern arrangement of a display element section of a touch panel incorporating a liquid crystal display device according to a modification example of Embodiment 3. FIG. 14(B) is a cross-sectional view of the display element section, taken along the line T-T of FIG. 14(A). Here, for a display element section 20 shown in FIG. 14, the same reference characters are provided for constituting elements identical or corresponding to those of the display element section 19 according to Embodiment 3, and mainly differences from the display element section 19 are described.

Unlike the display element section 19 shown in FIG. 13, in the display element section 20, as shown in FIG. 14, not only the first sensor line 120, but the first dummy line 130 is also formed on the interlayer insulating film 240, over the auxiliary capacitance line 170. The first dummy line 130 is formed of the third conductive film, in parallel with the first sensor line 120, on the side opposite from the first and the second pad electrodes 390 and 395 of the first sensor line 120. This arrangement allows further improvement in the aperture ratio of the display element section 20 than that achieved in the touch panel incorporating a liquid crystal display device of Embodiment 3.

The first and the second pad electrodes 390 and 395 are disposed away from an edge in the width direction of the auxiliary capacitance line 170 by the distance equivalent to the width of the first dummy line 130 newly provided on the auxiliary capacitance line 170. Accordingly, the sensor spacer 430 is also disposed further away from the edge in the width direction of the auxiliary capacitance line 170. Consequently, the performance of the auxiliary capacitance line 170 as a black matrix is further enhanced.

The gate line 110 can also be formed of the third conductive film and be disposed on the interlayer insulating film 240 over the auxiliary capacitance line 170, extending in the horizontal direction and sandwiching the first and second pad electrodes 390 and 395. In that case, however, a point of contact for connecting the gate line 110 to the gate electrode of TFT 70 must additionally be formed. Whether the gate line 110 should also be formed over the auxiliary capacitance line 170 or not must be determined by weighing the aperture ratio improvement that can be achieved by forming the gate line 110 over the auxiliary capacitance line 170 and the aperture ratio reduction that can result from the formation of additional point of contact.

5. Embodiment 4

Figure 15:
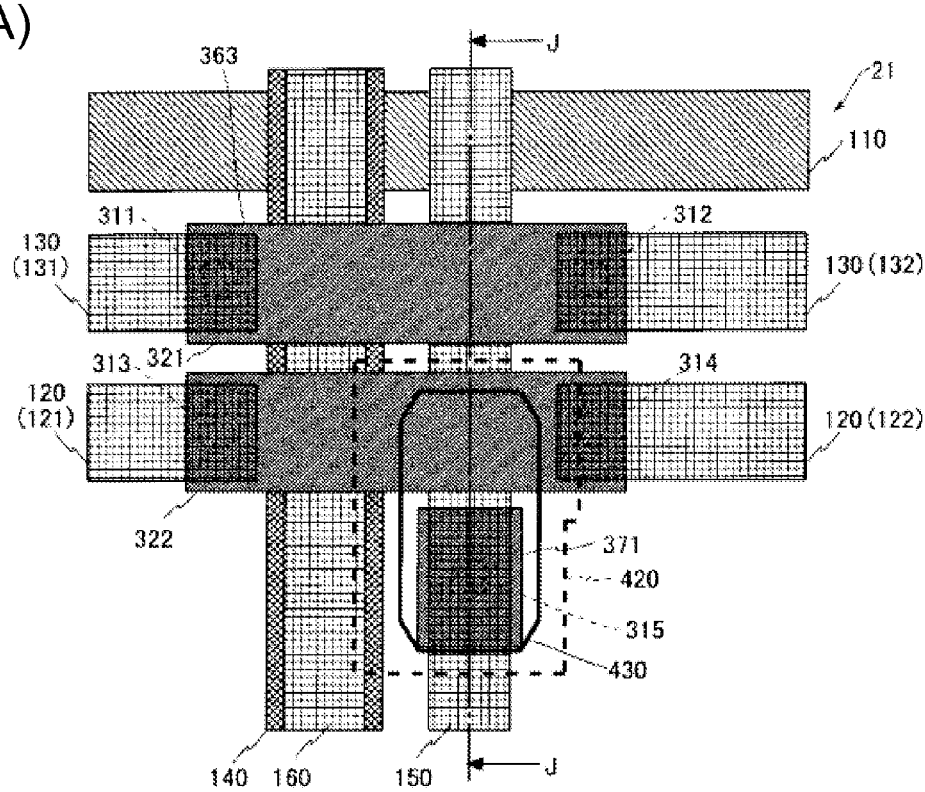
FIG. 15(A) is a plan view showing a part of the pattern arrangement in a display element section of the touch panel incorporating a liquid crystal display device according to Embodiment 4 of the present invention.
FIG. 15(B) is a cross-sectional view of the display element section 21, taken along the line J-J of FIG. 15(A).
Figure 15:
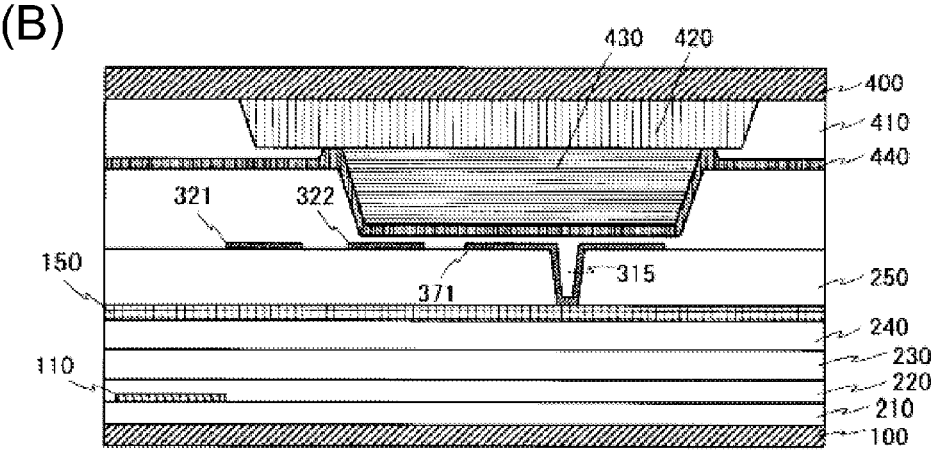

FIG. 15(A) is a plan view showing a part of the pattern arrangement of a display element section of a touch panel incorporating a liquid crystal display device according to Embodiment 4 of the present invention. FIG. 15(B) is a cross-sectional view of the display element section 21, taken along the line J-J of FIG. 15(A). Here, for the display element section 21 shown in FIG. 15, the same reference characters are provided for constituting elements identical or corresponding to those of the display element section 11 according to Embodiment 1, and mainly differences from the display element section 11 are described.

As shown in FIG. 15, on the base insulating film 210 formed on the insulating substrate 100, a gate line 110 made of the first conductive film and extending in the horizontal direction is formed. A gate insulating film 220 is formed over the gate line 110, and on the gate insulating film 220, a data line 140 made of the second conductive film and extending in the vertical direction is formed.

An interlayer insulating film 240 is formed over the data line 140. On the interlayer insulating film 240, a second sensor line 150 and a second dummy line 160 made of the third conductive film and extending in the vertical direction are formed in parallel with each other. The second dummy line 160 is disposed on the interlayer insulating film 240 at a location corresponding to the data line 140. The second dummy line 160 is narrower than the data line 140, and is disposed not to extend beyond the width of the data line 140. On the interlayer insulating film 240, a first sensor line 120 and a first dummy line 130 are formed of the third conductive film, extending in the horizontal direction, and in parallel with each other. The first sensor line 120 and the first dummy line 130 are disposed such that they do not overlap the gate line 110 when observed in a plan view.

As described above, the first sensor line 120 and the first dummy line 130 extend in the horizontal direction, and the second sensor line 150 and the second dummy line 160 extend in the vertical direction. These lines are all made of the third conductive film. Consequently, a measure needs to be taken to prevent short-circuiting at the intersection of the first sensor line 120 and the first dummy line 130, and the second sensor line 150 and the second dummy line 160. The second sensor line 150 and the second dummy line 160 are therefore individually constituted of a single, continuous conductive body, and the first sensor line 120 is constituted of two separate conductive bodies 121 and 122 sandwiching the second sensor line 150 and the second dummy line 160. Similarly, the first dummy line 130 is constituted of two separate conductive bodies 131 and 132 sandwiching the second sensor line 150 and the second dummy line 160.

A protective insulating film 250 is formed over the first sensor line 120, the second sensor line 150, the first dummy line 130, and the second dummy line 160. On the protective insulating film 250, three pad sections 321, 322, and 371 are formed, which are made of, as is the pixel electrode (not shown), the fourth conductive film. The pad section 321 is electrically connected to two conductive bodies 131 and 132 of the first dummy line 130 through contact holes 311 and 312, respectively. The pad section 322 is electrically connected to the conductive bodies 121 and 122 of the first sensor line 120 through contact holes 313 and 314, respectively. That is, the pad section 321 electrically connects the two separate conductive bodies 131 and 132 constituting the first dummy line 130 on the protective insulating film 250 to make them substantially a single conductive body. Also, the pad section 322 electrically connects the two separate conductive bodies 121 and 122 constituting the first sensor line 120 on the protective insulating film 250 to make them substantially a single conductive body. For this reason, the pad sections 321 and 322 are also referred to as "connecting bodies."

In the touch panel incorporating a liquid crystal display device according to the embodiment described above, the second dummy line 160 of the display element section 21 is disposed at a location corresponding to the data line 140 such that it does not extend beyond the width of the data line 140. Accordingly, the aperture ratio of the display element section 21 can be improved.

Both the first sensor line 120 and the second sensor line 150 are formed of the third conductive film. As a result, the depths from the surface of the protective insulating film 250 to the first sensor line 120 and to the second sensor line 150 are equal, and therefore, the five contact holes 311 to 315 have the same depth. Consequently, contact holes 311 to 315 can be opened without using the relay pad used in the basic study, and accordingly the aperture ratio of the display element section 11 can further be improved. Here, the manufacturing process is more simplified compared to the case where the first sensor line 120 and the second sensor line 150, and the first dummy line 130 and the second dummy line 160 are formed of different conductive films.

The pad section 322 functions as the first sensor electrode 300 shown in FIG. 2, and the pad section 371 functions as the second sensor electrode 350 shown in FIG. 2. Both of the pad sections are formed on the protective insulating film 250, which is the top layer of the TFT substrate 30. Consequently, the distance from the common electrode 440 formed on the surface of the sensor spacer 430 formed on the CF substrate 40 to the pad section 322, and the distance from the common electrode 440 to the pad section 371 are equal. As a result, when the surface of the CF substrate 40 is pressed, the common electrode 440 formed on the surface of the sensor spacer 430 touches the pad section 322 and the pad section 371 simultaneously, and therefore, the display element section 21 as a touch sensor can reliably detect the location of the touch.

The pad sections 321 and 322 also function as jumpers. With the pad sections 321 and 322 provided, the separate two conductive bodies 121 and 122, and the separate two conductive bodies 131 and 132 can electrically be connected together, respectively, and therefore the first sensor line 120 and the first dummy line 130, and the second sensor line 150 and the second dummy line 160 can be formed of conductive films of the same layer. That is, instead of forming the first sensor line 120 and the first dummy line 130, and the second sensor line 150 and the second dummy line 160 using two layers of conductive films, the pad sections 321 and 322 are used as jumpers so that these pairs of the lines can be formed using a single conductive film. As a result, conductive films that are no longer used can be used to form other wiring, which improves the flexibility in the wiring layout.

Alternatively, the first sensor line and the first dummy line may be formed of a single conductive body, and the second sensor line and the second dummy line may be formed of two separate conductive bodies. Also, the positions of the gate line and the first dummy line may be switched, and the first dummy line may be formed of a single conductive body, and the gate line may be formed of two separate conductive bodies.

In the display element section 21 of the present embodiment, the first dummy line 130 extending in the horizontal direction, and the second dummy line 160 extending in the vertical direction are formed. Alternatively, however, only one of the first dummy line 130 and the second dummy line 160 may be formed. In this case, the location of a touch in the direction in which a dummy line is not formed is identified as explained in detail in the description of Embodiment 5 below.

5.1 Modification Example 1

Figure 16:
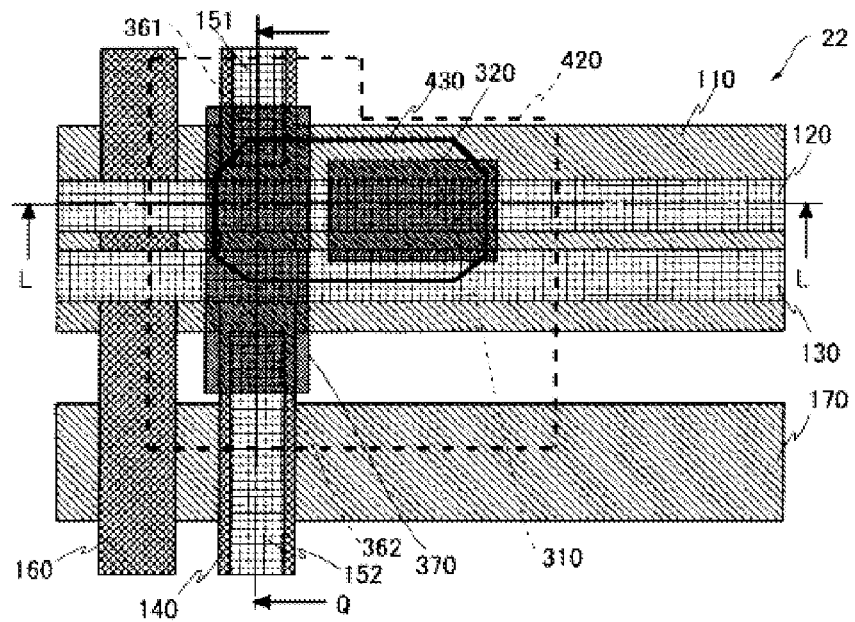
FIG. 16(A) is a plan view showing a part of the pattern arrangement in a display element section of the touch panel incorporating a liquid crystal display device according to Modification Example 1 of Embodiment 4.
FIG. 16(B) is a cross-sectional view of the display element section, taken along the line L-L of FIG. 16(A).
FIG. 16(C) is a cross-sectional view of the display element section 22 taken along the line Q-Q of FIG. 16(A).
Figure 16:
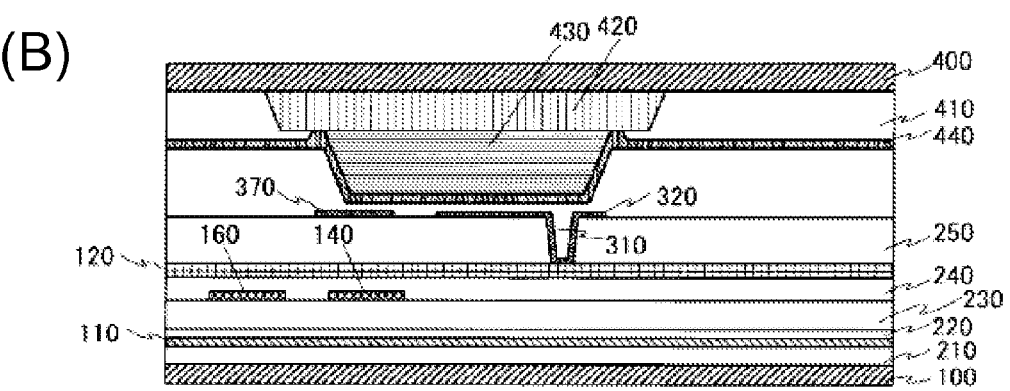
Figure 16:
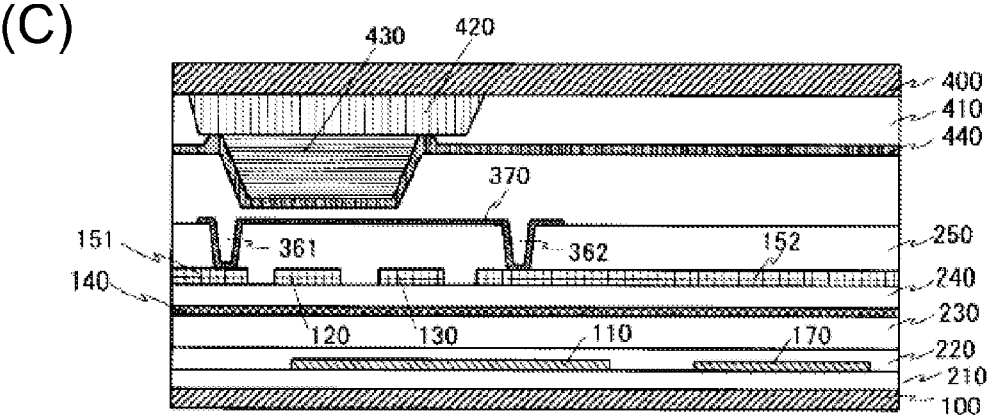

FIG. 16(A) is a plan view showing a part of a display element section of a touch panel incorporating a liquid crystal display device according to Modification Example 1 of Embodiment 4. FIG. 16(B) is a cross-sectional view of the display element section, taken along the line L-L of FIG. 16(A). FIG. 16(C) is a cross-sectional view of the display element section 22, taken along the line Q-Q of FIG. 16(A). Here, for a display element section 22 shown in FIG. 16, the same reference characters are provided for constituting elements identical or corresponding to those of the display element section 14 according to Modification Example 3 of Embodiment 1 shown in FIG. 8, and mainly differences from the display element section 14 are described.

In the display element section 14 shown in FIG. 8, the first dummy line 130, together with the first sensor line 120, is disposed on the interlayer insulating film 240 at locations corresponding to the auxiliary capacitance line 170 such that they do not extend beyond the width of the auxiliary capacitance line 170. However, in the display element section 22, as shown in FIG. 16, only the positions of the auxiliary capacitance line 170 and the gate line 110 are switched. As a result, the first dummy line 130, together with the first sensor line 120, is disposed on the interlayer insulating film 240 at locations corresponding to the gate line 110 such that they do not extend beyond the width of the gate line 110 when observed in a plan view. Here, the touch panel incorporating a liquid crystal display device according to the embodiment described above is similar to those of the touch panel incorporating a liquid crystal display device according to Modification Example 3 of Embodiment 1, and therefore explanation of such effects are omitted. Also, alternatively, the second sensor line may be formed of a single conductive body, and the first sensor line and the first dummy line may each be formed of two separate conductive bodies.

6. Embodiment 5

Figure 17:
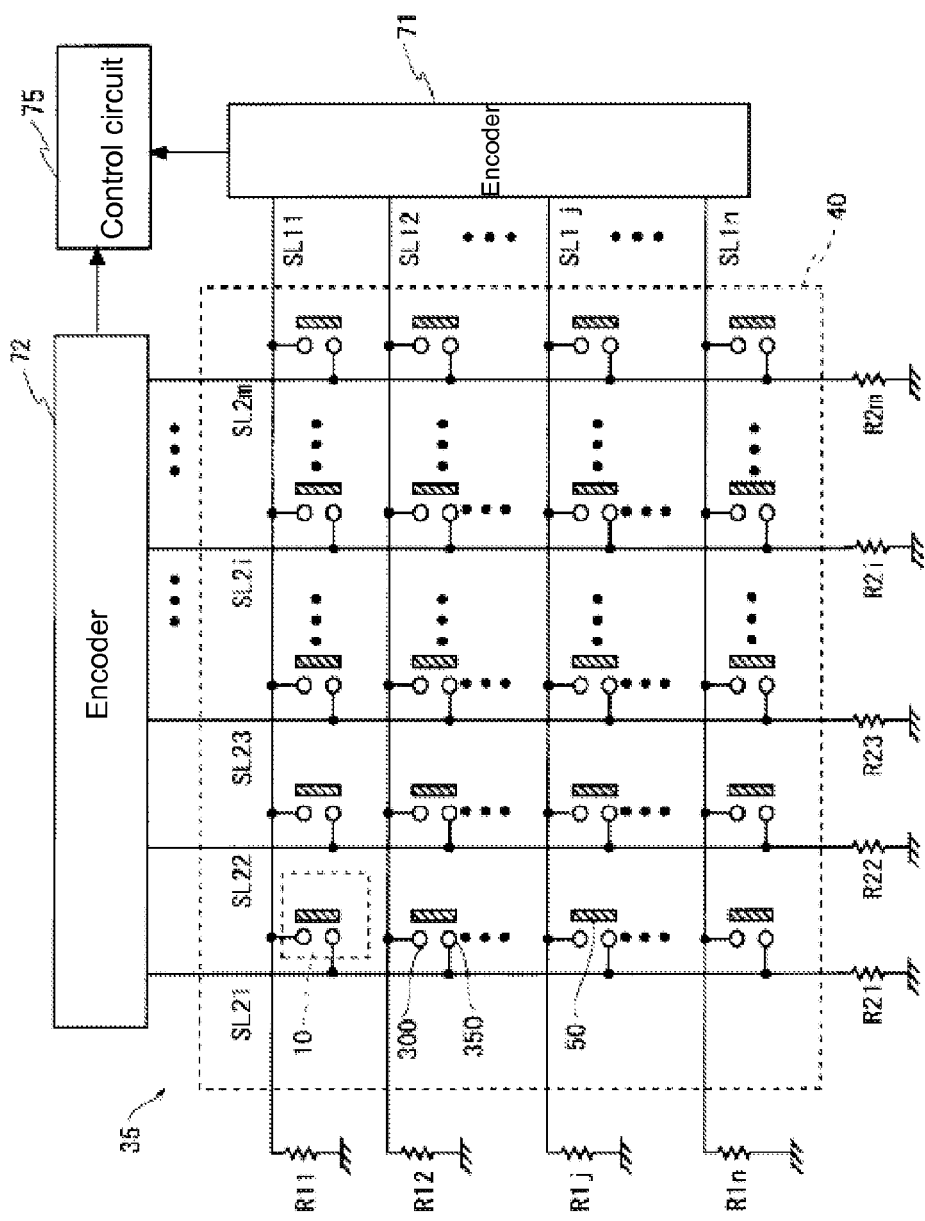
FIG. 17 shows the configuration of the touch panel incorporating a liquid crystal display device according to Embodiment 5 of the present invention.
Figure 18:
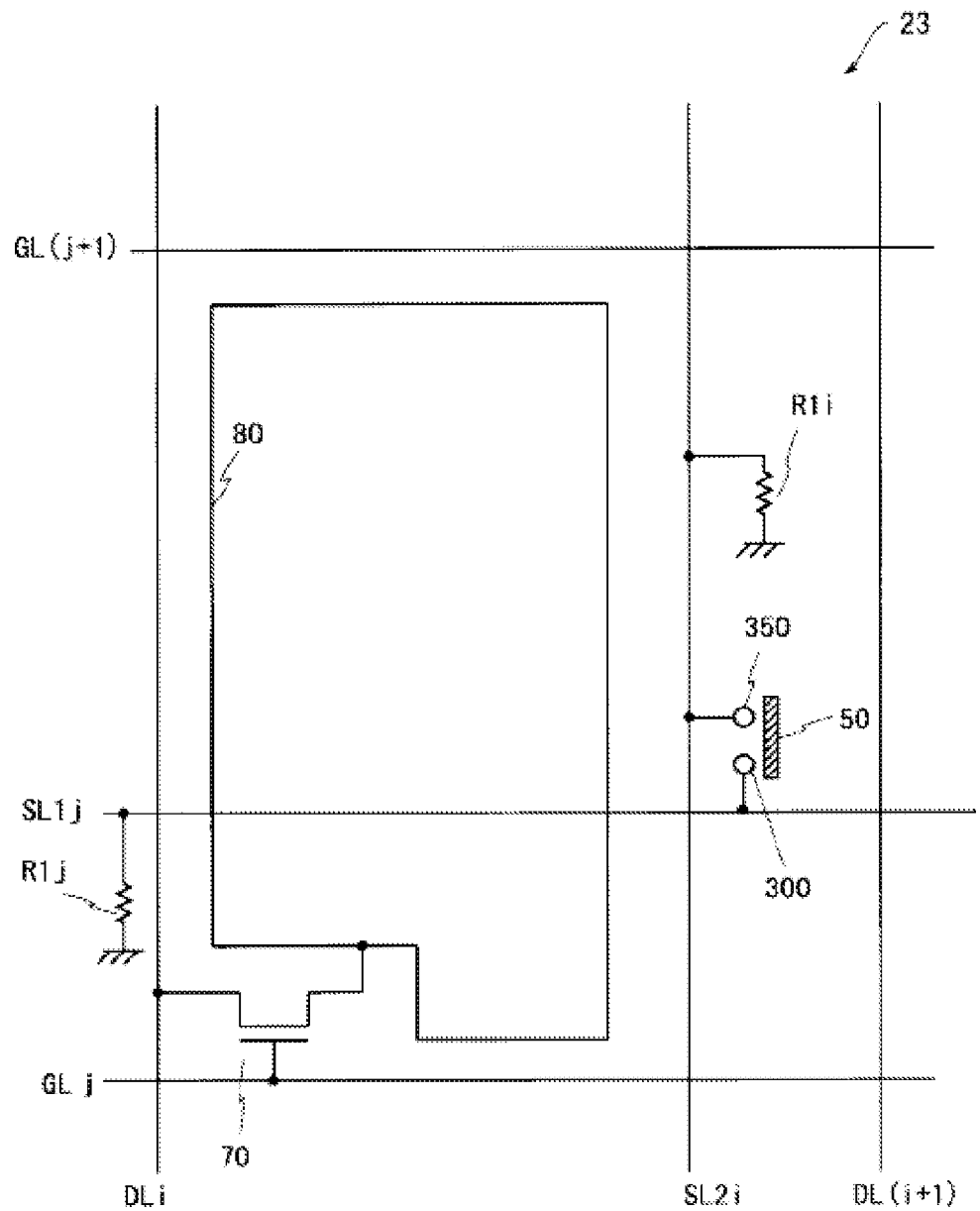
FIG. 18 shows the configuration of the pixel formation section on the TFT substrate side of the touch panel incorporating a liquid crystal display device shown in FIG. 17.

6.1 Configuration and Operation of the Touch Panel Incorporating a Liquid Crystal Display Device FIG. 17 shows the configuration of a touch panel incorporating a liquid crystal display device of Embodiment 5 of the present invention, and FIG. 18 shows the configuration of the pixel formation section on the TFT substrate side of the touch panel incorporating a liquid crystal display device shown FIG. 17. Here, for the touch panel incorporating a liquid crystal display device of Embodiment 5, the same reference characters are provided for constituting elements identical or corresponding to those of the touch panel incorporating a liquid crystal display device of Embodiment 1 shown in FIG. 2 and FIG. 3, and mainly differences between them are described.

As shown in FIG. 17, unlike the TFT substrate 30 of the touch panel incorporating a liquid crystal display device shown in FIG. 2, a TFT substrate 35 of the touch panel incorporating a liquid crystal display device does not have a first dummy line and a second dummy line. Also, neither a first comparator that compares the first sensor line potential and the first dummy line potential nor a second comparator that compares the second sensor line potential and the second dummy line potential are provided. The first sensor lines SL11 to SL1n are connected to the first encoder circuit 71, and the second sensor lines SL21 to SL2m are connected to the second encoder circuit 72. Also in FIG. 18, gate lines GL1 to GLn, and data lines DL1 to DLm are omitted for simplicity. The configuration of the CF substrate 40 is the same as that of the CF substrate 40 according to Embodiment 1 shown in FIG. 4, and therefore its description is omitted.

As described above, in the touch panel incorporating a liquid crystal display device shown in FIG. 17, no first dummy line, second dummy line, first comparator, or second comparator is provided. As a result, the first sensor lines SL11 to SL1n each supply a common voltage received from the pressing electrode 50, or a ground potential received through the pulldown resistors R11 to R1n to the first encoder circuit 71. Also, the second sensor lines SL21 to SL2m each supply a common voltage received from the pressing electrode 50 or a ground potential received through the pulldown resistors R21 to R1m to the second encoder circuit 72. The first encoder circuit 71 generates bit signals based on the common voltage and the ground voltage provided from the first sensor lines SL11 to SL1n and provides them to the control circuit 75. Similarly, the second encoder circuit 72 generates bit signals based on the common voltage and the ground voltage provided from the second sensor lines SL21 to SL2m, and supplies them to a control circuit 75. The control circuit 75 identifies the location of a touch on the CF substrate 40 based on the bit signals provided.

Also, as shown in FIG. 18, a TFT 70 is provided for respective display element section 23. The gate electrode of the j$^{th}$ row of TFT 70 is connected to the gate line GLj, the source electrode of the i$^{th}$ column is connected to the data line DLi, and the drain electrode is connected to the pixel electrode 80. However, unlike the display element section 11 shown in FIG. 3, neither a first dummy line nor a second dummy line is provided.

6.2 Configuration of the Display Element Section

Figure 19:
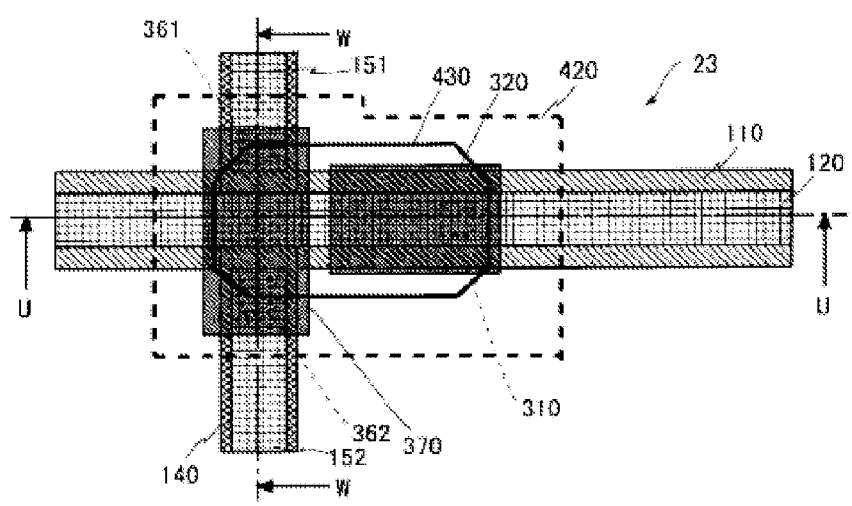
FIG. 19(A) is a plan view showing a part of the pattern arrangement in a display element section of the touch panel incorporating a liquid crystal display device according to Embodiment 5 of the present invention.
FIG. 19(B) is a cross-sectional view of the display element section, taken along the line U-U of FIG. 19(A).
FIG. 19(C) is a cross-sectional view of the display element section taken along the line W-W of FIG. 19(A).
Figure 19:
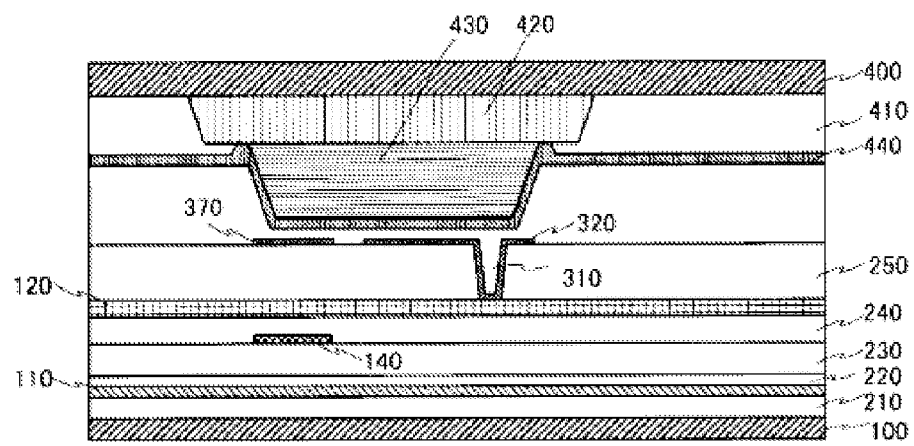
Figure 19:
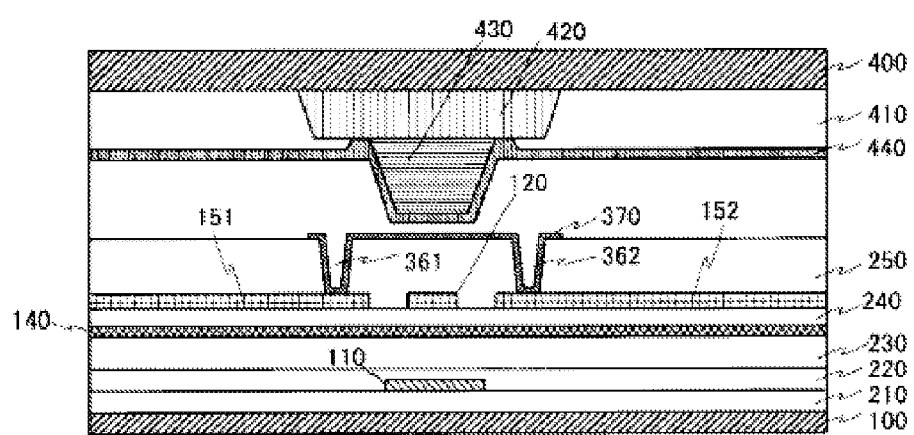

FIG. 19(A) is a plan view showing a part of the pattern arrangement of the display element section of the touch panel incorporating a liquid crystal display device according to Embodiment 5 of the present invention. FIG. 19(B) is a cross-sectional view of the display element section, taken along the line U-U of FIG. 19(A). FIG. 19(C) is a cross-sectional view of the display element section, taken along the line W-W of FIG. 19(A). Here, for a display element section 23 shown in FIG. 19, the same reference characters are provided for constituting elements identical or corresponding to those of the display element section 12 according to Modification Example 1 of Embodiment 1, and mainly differences from the display element section 12 are described.

As shown in FIG. 19, the wiring arrangement in the display element section 23 is identical to that of the display element section 12 shown in FIG. 6 except that the first dummy line 130 and the second dummy line 160 are removed, and therefore the explanation is omitted. Here, because neither first dummy wiring nor second dummy wiring is formed in the display element section 23, the aperture ratio of the touch panel incorporating a liquid crystal display device in the above embodiments can be improved accordingly. Other effects are similar to those of the touch panel incorporating a liquid crystal display device according to Modification Example 1 of Embodiment 1, and therefore explanation of such effects is omitted. Alternatively, the second sensor line may be formed of a single conductive body, and the first sensor line may be formed of two separate conductive bodies.

6.3 Modification Example 1

Figure 20:
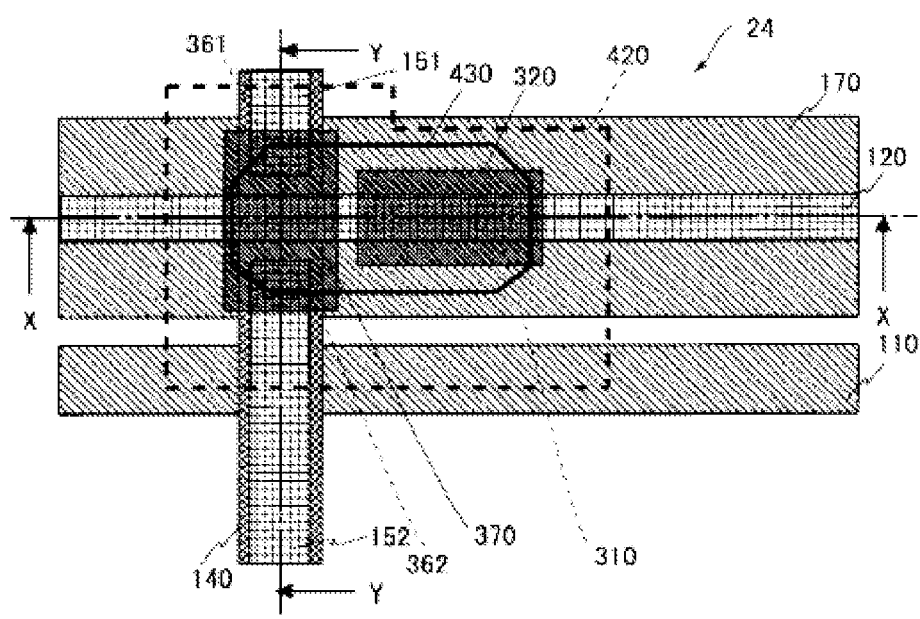
FIG. 20(A) is a plan view showing a part of the pattern arrangement in a display element section of the touch panel incorporating a display device according to Modification Example 1 of Embodiment 5 of the present invention.
FIG. 20(B) is a cross-sectional view of the display element section, taken along the line X-X of FIG. 20(A).
FIG. 20(C) is a cross-sectional view of the display element section taken along the line Y-Y of FIG. 20(A).
Figure 20:
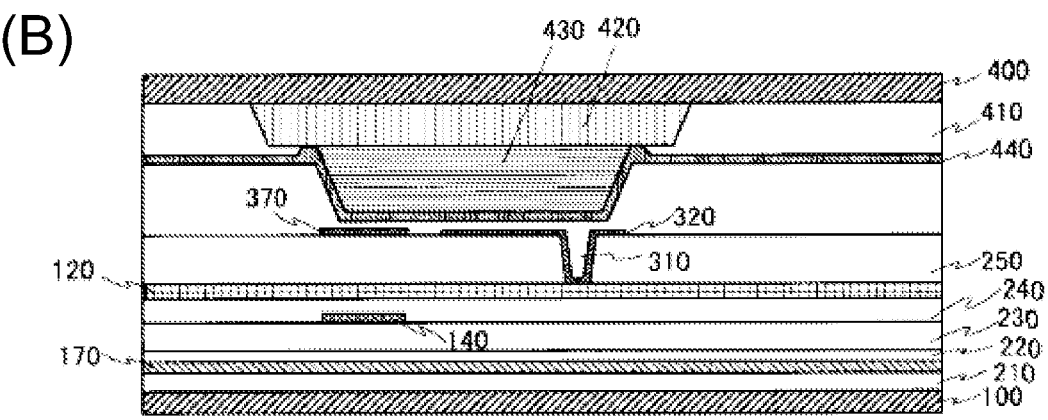
Figure 20:
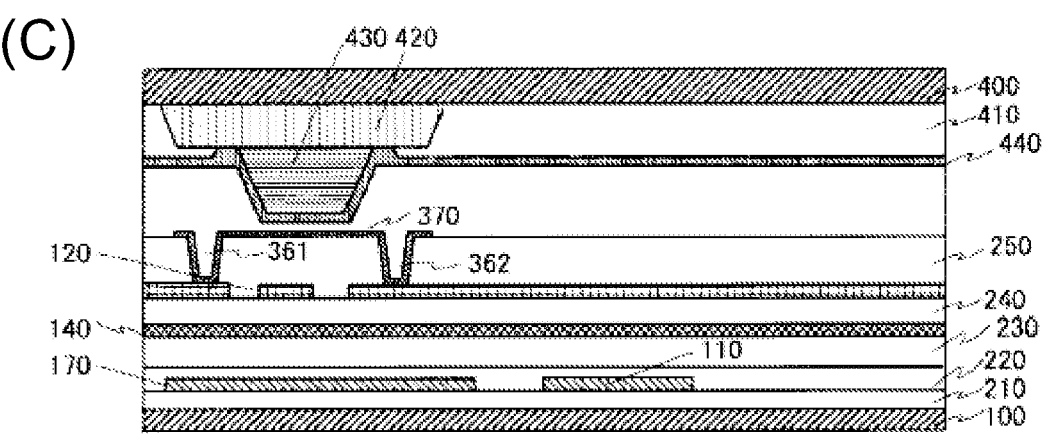

FIG. 20(A) is a plan view showing a part of the pattern arrangement of a display element section of a touch panel incorporating a liquid crystal display device according to Modification Example 1 of Embodiment 5 of the present invention. FIG. 20(B) is a cross-sectional view of the display element section, taken along the line X-X of FIG. 20(A). FIG. 20(C) is a cross-sectional view of the display element section, taken along the line Y-Y of FIG. 20(A). Here, for a display element section 24 shown in FIG. 20, the same reference characters are provided for constituting elements identical or corresponding to those of the display element section 13 of Modification Example 3 of Embodiment 1, and mainly differences from the display element section 13 are described.

As shown in FIG. 20, the wiring arrangement of a display element section 24 is identical to that of the display element section 13 shown in FIG. 7 except that the first dummy line 130 and the second dummy line are removed. Here, similar to the display element section 23, neither first dummy wiring nor second dummy wiring is formed in the display element section 24, and therefore the aperture ratio of the touch panel incorporating a liquid crystal display device of the embodiment described above can be improved accordingly. Other effects are similar to those of the display element section 13 of Modification Example 3 of Embodiment 1, and therefore explanation of such effects is omitted. Also, alternatively, the second sensor line may be formed of a single conductive body, and the first sensor line may be formed of two separate conductive bodies.

7. Misc

In Embodiment 1, as shown in FIG. 5, the first sensor line 120 has a width smaller than that of the first dummy line 130, and the first sensor line 120 is disposed on the interlayer insulating film 240 such that it does not extend beyond the width of the first dummy line 130 when observed in a plan view.

However, the first dummy line 130 may be disposed to extend beyond the width of the first sensor line 120. Also, the width of the first dummy line 130 may be the same as the width of the first sensor line 120. In this case, the first dummy line 130 fully overlaps with the first sensor line 120, and therefore it may be disposed not to extend beyond the width of the first sensor line 120, but alternatively can be disposed to extend beyond the width of the first sensor line 120. Also, the width of the first sensor line 120 may be wider than the width of the first dummy line 130. In this case, the first sensor line 120 is disposed to partially extend beyond the width of the first dummy line 130 when observed in a plan view.

Here, regarding the relationship between the first sensor line 120 and the first dummy line 130, there are variations depending on the widths and the locations of the lines. Among these variations, the one in which the aperture ratio of the display element section 11 can be improved most, as discussed in the description of Embodiment 1, is where the first sensor line 120 is disposed such that it does not extend beyond the width of the first dummy line 130 when observed in a plan view. However, even in the case described above, compared to the case where the first sensor line 120 and the first dummy line 130 do not overlap at all, the aperture ratio of the display element section 11 can be improved if the first sensor line 120 and the first dummy line 130 overlap at least partially when observed in a plan view.

Although Embodiment 1 is used as an example here, also for Embodiments 1 to 5 and their modification examples described above, instead of disposing an upper wiring layer over an lower wiring layer such that the upper wiring layer does not extend beyond the width of the lower wiring layer when observed in a plan view, the upper and lower wiring layers can be disposed such that they at least partially overlap with each other so that the aperture ratio of the display element sections 12 to 24 can be improved by the amount of the overlap.

INDUSTRIAL APPLICABILITY

The touch panel incorporating a display device of the present invention is used for a display of an electronic device that allows users to select desired menus by pressing the panel with a pen or a finger.

DESCRIPTION OF REFERENCE CHARACTERS 10-20 display element section
30 TFT substrate
40 CF substrate
50 pressing electrode
100, 400 insulating substrate
110 gate line
120 first sensor line
130 first dummy line
140 data line
150 second sensor line
160 second dummy line
170 auxiliary capacitance line
300 first sensor electrode
320, 321, 322, 370, 371 pad section
350 second sensor electrode
390 first pad electrode
395 second pad electrode
420 black matrix
430 sensor spacer

The invention claimed is:

1. A touch panel incorporating a display device, having a first insulating substrate and a second insulating substrate facing each other, and identifying the location of a touch on a surface of said second insulating substrate based on a prescribed voltage supplied when said surface is touched, the touch panel comprising:
a plurality of first sensor lines formed on said first insulating substrate to extend in a first direction;
a plurality of second sensor lines formed on said first insulating substrate to extend in a second direction crossing said first direction;
a first wiring formed to extend in said first direction and including a plurality of gate lines;
a second wiring formed to extend in said second direction and including a plurality of data lines;

a plurality of display element sections formed for respective regions where said plurality of gate lines and said plurality of data lines cross each other; and a location-identifying circuit that identifies the location of a touch on a surface of said second insulating substrate based on a prescribed voltage supplied, when the surface is touched, to said first and second sensor lines connected to said display element sections at the location that is touched, wherein said second insulating substrate has a pressing electrode provided with said prescribed voltage, wherein at least either said first sensor line or said second sensor line is disposed over any one of wirings included in said first wiring or said second wiring in such manner as to overlap at least partially in the width direction with said any one of the wirings included in said first wiring or said second wiring when observed in a plan view, wherein at least either said first sensor line or said second sensor line is constituted of separate conductive bodies, wherein said separate conductive bodies are electrically connected to each other through a connecting body, and wherein said pressing electrode touches said connecting body when a surface of said second insulating substrate is pressed, to supply said prescribed voltage to said separate conductive bodies.

2. The touch panel incorporating a display device according to claim 1, wherein at least one of said first wiring and said second wiring further includes either a plurality of first dummy lines formed to extend in said first direction and provided with a reference voltage or a plurality of second dummy lines formed to extend in said second direction and provided with said reference voltage, and wherein said location-identifying circuit includes a comparative identifying circuit that identifies the location of a touch on a surface of the second insulating substrate by comparing said prescribed voltage supplied, when said surface is touched, to said first sensor line and said second sensor line against said reference voltage.

3. The touch panel incorporating a display device according to claim 2, wherein said first wiring further includes an auxiliary capacitance line formed to extend in said first direction.

4. The touch panel incorporating a display device according to claim 1, wherein said first wiring further includes an auxiliary capacitance line formed to extend in said first direction.

5. The touch panel incorporating a display device according to claim 1, wherein said first sensor line and said second sensor line are each formed of a conductive film in the same layer.

6. The touch panel incorporating a display device according to claim 1, wherein said first sensor line is disposed over said gate line, wherein said second sensor line is formed of a conductive film in the same layer as said first sensor line, and is disposed over said data line wherein one of said first sensor line and said second sensor line is constituted of a single conductive body, and the other of the sensor lines is constituted of two conductive bodies sandwiching said single conductive body, wherein said two conductive bodies are electrically connected to each other through said connecting body, wherein said pressing electrode touches said connecting body when a surface of said second insulating substrate is pressed, to supply said prescribed voltage to said two conductive bodies.

7. The touch panel incorporating a display device according to claim 2, further comprising:

a plurality of first sensor electrodes electrically connected to said first sensor lines and provided in respective said display element sections; and a plurality of second sensor electrodes connected to said second sensor lines and provided in respective said display element sections, wherein said second insulating substrate faces the first sensor electrode and the second sensor electrode, with a prescribed space therebetween, and wherein when a surface of said second insulating substrate is pressed, said pressing electrode at the location that is pressed touches the corresponding first sensor electrode and the corresponding second sensor electrode to supply said prescribed voltage to said first sensor line and said second sensor line.

8. The touch panel incorporating a display device according to claim 7, wherein either said first sensor electrode or said second sensor electrode corresponding to said at least either said first sensor line or said second sensor line that is constituted of the separate conductive bodies includes said connecting body electrically connecting said separate conductive bodies together.

9. The touch panel incorporating a display device according to claim 8, wherein said first sensor line is formed of a conductive film in a layer above said gate line and said data line, and is disposed over either said gate line or said first dummy line, wherein said second sensor line is formed of a conductive film in the same layer as said first sensor line, and is disposed over said data line wherein one of said first sensor line and said second sensor line is constituted of a single conductive body, and the other of the sensor lines is constituted of two conductive bodies sandwiching said single conductive body, and wherein said two conductive bodies are electrically connected to each other through said connecting body.

10. The touch panel incorporating a display device according to claim 9, wherein one of said first and second sensor electrodes electrically connected to said one of said first sensor line and said second sensor line has a first contact hole leading to said single conductive body, and has a first pad section that is formed at a location facing said pressing electrode and that is electrically connected to said single conductive body through said first contact hole, wherein one of said first and said second sensor electrode that is electrically connected to the other one of the sensor lines has a second contact hole and a third contact hole leading to said respective two conductive bodies, and has a second pad section that is disposed at a location facing said pressing electrode and that is electrically connected to said two conductive bodies respectively through said second and said third contact holes, and wherein a distance between said first pad section and said pressing electrode is equal to a distance between said second pad section and said pressing electrode.

11. The touch panel incorporating a display device according to claim 7, wherein said first sensor line is formed of a conductive film in the same layer as said gate line and is disposed to extend in the first direction, and wherein said second sensor line is formed of a conductive film in a layer above said gate line and said data line, and disposed over said data line.

12. The touch panel incorporating a display device according to claim 7,
wherein said first sensor line is formed of a conductive film in a same layer as said gate line, and is disposed to extend in the first direction, and
wherein said second sensor line is formed of a conductive film in a layer above said gate line and said data line, and is disposed over said second dummy line.

13. The touch panel incorporating a display device according to claim 7,
wherein said first sensor line is formed of a conductive film in a layer above said gate line and said data line, and is disposed over said first dummy line, and
wherein said second sensor line is formed of a conductive film in a same layer as said data line, and is disposed to extend in the second direction.

14. The touch panel incorporating a display device according to claim 7,
wherein said first sensor line is formed of a conductive film in a layer above said gate line and said data line, and is disposed over said gate line, and
wherein said second sensor line is formed of a conductive film in a same layer as said data line, and is disposed to extend in the second direction.

15. The touch panel incorporating a display device according to claim 11,
wherein said first sensor electrode includes a first pad electrode composed of a pad wiring branching off from said first sensor line and conductive pads sequentially laminated thereon, the conductive pads being made of conductive films in layers above said first sensor electrode, and
wherein said second sensor electrode includes a second pad electrode composed of a pad wiring branching off from said second sensor line and conductive pads sequentially laminated thereon, said conductive pads being made of conductive films in layers above said second pad electrode.

16. The touch panel incorporating a display device according to claim 9, further comprising a black matrix disposed over said pressing electrode to cover said pressing electrode.

17. The touch panel incorporating a display device according to claim 3, further comprising:
a plurality of first sensor electrodes electrically connected to the first sensor lines and provided in the respective display element sections; and
a plurality of second sensor electrodes electrically connected to said second sensor lines and provided in the respective display element sections,
wherein said second insulating substrate faces the first sensor electrode and the second sensor electrode with a prescribed space provided inbetween, and
wherein when a surface of said second insulating substrate is pressed, said pressing electrode at the location that is pressed touches said corresponding first sensor electrode and said corresponding second sensor electrode to supply the prescribed voltage to said first sensor line and said second sensor line.

18. The touch panel incorporating a display device according to claim 17,
wherein one of said first sensor electrode and said second sensor electrode corresponding to said at least either said first sensor line or said second sensor line that is constituted of separate conductive bodies includes said connecting body that connects the separate conductive bodies together.

19. The touch panel incorporating a display device according to claim 18,
wherein said auxiliary capacitance line is formed of a conductive film in the same layer as said gate line,
wherein said first sensor line is formed of a conductive film in the same layer as said second sensor line and is disposed over said auxiliary capacitance line,
wherein one of said first sensor line and said second sensor line is constituted of a single conductive body, and the other one of the sensor lines are constituted of two conductive bodies sandwiching said single conductive body, and
wherein said two conductive bodies are electrically connected to each other through said connecting body.

20. The touch panel incorporating a display device according to claim 19, wherein said first dummy line made of a conductive film in the same layer as said second sensor line is further disposed over said auxiliary capacitance line.

21. The touch panel incorporating a display device according to claim 19,
wherein one of said first sensor electrode and the second sensor electrode electrically connected to said one of said first sensor line and said second sensor line has a first contact hole that leads to said single conductive body, and has a first pad section that is disposed facing the pressing electrode, and that is electrically connected to said single conductive body through said first contact hole,
wherein one of said first sensor electrode and said second sensor electrode electrically connected to said the other one of the sensor lines has second and third contact holes that respectively lead to said two conductive bodies, and has a second pad section that is disposed facing said pressing electrode and that is electrically connected to said two conductive bodies respectively through said second and third contact holes, and
wherein a distance between said first pad section and said pressing electrode is equal to a distance between said second pad section and said pressing electrode.

22. The touch panel incorporating a display device according to claim 19, further comprising a black matrix disposed over said pressing electrode to cover said pressing electrode.

23. The touch panel incorporating a display device according to claim 17, wherein said auxiliary capacitance line is formed of a conductive film in the same layer as the gate line,
wherein said gate line and said auxiliary capacitance line are formed of a light-shielding conductive film,
wherein said first sensor line is formed of a conductive film in a layer above said gate line and said data line, and is disposed over said auxiliary capacitance line,
wherein said second sensor line is formed of a conductive film in a same layer as said data line, and is disposed to extend in the second direction,
wherein said first sensor electrode and said second sensor electrode are disposed over said auxiliary capacitance line, and
wherein at least said first sensor line is disposed over said auxiliary capacitance line, between said first and second sensor electrodes and an edge in width direction of said auxiliary capacitance line.

24. The touch panel incorporating a display device according to claim 23, wherein the first dummy line made of a conductive film in the same layer as said first sensor line is further disposed above said auxiliary capacitance line, between said first sensor line and an edge in width direction of said auxiliary capacitance line.

25. The touch panel incorporating a display device according claim 23,
wherein said first sensor electrode includes a first pad electrode in which conductive pads made of conductive films of layers above said first sensor electrode are sequentially laminated on a pad wiring branching off from said first sensor line, and
wherein said second sensor electrode includes a second pad electrode in which conductive pads made of conductive films of layers above the second sensor electrode are sequentially laminated on a pad wiring branching off from the second sensor line.

26. The touch panel incorporating a display device according to claim 4,
wherein said auxiliary capacitance line is formed of a conductive film in a same layer as said gate line,
wherein said first sensor line is disposed over the auxiliary capacitance line,
wherein said second sensor line is formed of a conductive film in a same layer as said first sensor line and is disposed over said data line that is formed over said auxiliary capacitance line,
wherein one of said first sensor line and said second sensor line is constituted of a single conductive body, and the other one of the sensor lines is constituted of two conductive bodies,
wherein said two conductive bodies are electrically connected to each other through said connecting body, and
wherein when a surface of said second insulating substrate is pressed, said pressing electrode touches said connecting body to supply said prescribed voltage to said two conductive bodies.

27. A touch panel incorporating a display device having a first insulating substrate and a second insulating substrate facing each other, identifying a touch on said second insulating substrate based on a prescribed voltage supplied when the surface is touched and a reference voltage provided in advance, the touch panel comprising:
at least either a plurality of first dummy lines disposed on said first insulating substrate to extend in a first direction and provided with the reference voltage or a plurality of second dummy lines disposed on said first insulating substrate to extend in a second direction crossing the first direction and provided with the reference voltage;
a first wiring formed to extend in the first direction and including a plurality of gate lines and a plurality of first sensor lines;
a second wiring formed to extend in the second direction and including a plurality of data lines and a plurality of second sensor lines;
a plurality of display element sections formed in respective regions where the plurality of gate lines and the plurality of data lines cross each other;
a location-identifying circuit that identifies the location of a touch on a surface of said second insulating substrate by comparing said prescribed voltage that is supplied, when said surface is touched, to said first and second sensor lines connected to said display element sections at the location of the touch against said reference voltage; and
a connecting body disposed over at least either said first dummy line or said second dummy line,
wherein said first dummy line and said second dummy line are formed of conductive films in the same layer, and said at least either said first dummy line or said second dummy line is constituted of two separate conductive bodies,
wherein said separate conductive bodies are electrically connected to each other through said second connecting body, and
wherein at least either one of said first dummy line or said second dummy line is disposed over any one of wirings included in said first wiring or said second wiring in such manner as to overlap at least partially in the width direction with said any one of the wirings included in said first wiring or said second wiring when observed in a plan view.

28. The touch panel incorporating a display device according to claim 27, wherein said first wiring further includes an auxiliary capacitance line formed to extend in the first direction.

29. A touch panel incorporating a display device, having a first insulating substrate and a second insulating substrate facing each other, and identifying the location of a touch on a surface of said second insulating substrate based on a prescribed voltage supplied when said surface is touched, the touch panel comprising:
a plurality of first sensor lines formed on said first insulating substrate to extend in a first direction;
a plurality of second sensor lines formed on said first insulating substrate to extend in a second direction crossing said first direction;
a first wiring formed to extend in said first direction and including a plurality of gate lines;
a second wiring formed to extend in said second direction and including a plurality of data lines;
a plurality of display element sections formed for respective regions where said plurality of gate lines and said plurality of data lines cross each other; and
a location-identifying circuit that identifies the location of a touch on a surface of said second insulating substrate based on a prescribed voltage supplied, when the surface is touched, to said first and second sensor lines connected to said display element sections at the location that is touched,
wherein at least either said first sensor line or said second sensor line is disposed over any one of wirings included in said first wiring or said second wiring in such manner as to overlap at least partially in the width direction with said any one of the wirings included in said first wiring or said second wiring when observed in a plan view,
wherein said display element section includes a thin film transistor, and
wherein an oxide film conversion thickness of an insulating layer between said gate line and said data line is greater than the oxide film conversion thickness of a gate insulating layer of said thin film transistor.

30. The touch panel incorporating a display device according to claim 12,
wherein said first sensor electrode includes a first pad electrode composed of a pad wiring branching off from said first sensor line and conductive pads sequentially laminated thereon, the conductive pads being made of conductive films in layers above said first sensor electrode, and
wherein said second sensor electrode includes a second pad electrode composed of a pad wiring branching off from said second sensor line and conductive pads sequentially laminated thereon, said conductive pads being made of conductive films in layers above said second pad electrode.

31. The touch panel incorporating a display device according to claim 13, wherein said first sensor electrode includes a first pad electrode composed of a pad wiring branching off from said first sensor line and conductive pads sequentially laminated thereon, the conductive pads being made of conductive films in layers above said first sensor electrode, and wherein said second sensor electrode includes a second pad electrode composed of a pad wiring branching off from said second sensor line and conductive pads sequentially laminated thereon, said conductive pads being made of conductive films in layers above said second pad electrode.

32. The touch panel incorporating a display device according to claim 14, wherein said first sensor electrode includes a first pad electrode composed of a pad wiring branching off from said first sensor line and conductive pads sequentially laminated thereon, the conductive pads being made of conductive films in layers above said first sensor electrode, and wherein said second sensor electrode includes a second pad electrode composed of a pad wiring branching off from said second sensor line and conductive pads sequentially laminated thereon, said conductive pads being made of conductive films in layers above said second pad electrode.

* * * * *